United States Patent
Baroudi et al.

(10) Patent No.: US 10,843,339 B2
(45) Date of Patent: *Nov. 24, 2020

(54) DEPLOYMENT METHOD FOR SENSORS IN A WIRELESS SENSOR NETWORK

(71) Applicant: KING FAHD UNIVERSITY OF PETROLEUM AND MINERALS, Dhahran (SA)

(72) Inventors: Uthman Baroudi, Dhahran (SA); Md. Enamul Haque, Dhahran (SA); Mohammed Azharuddin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 100 days.

This patent is subject to a terminal disclaimer.

(21) Appl. No.: 16/131,926

(22) Filed: Sep. 14, 2018

(65) Prior Publication Data

US 2019/0015979 A1 Jan. 17, 2019

Related U.S. Application Data

(63) Continuation of application No. 15/066,821, filed on Mar. 10, 2016, now Pat. No. 10,112,300.

(Continued)

(51) Int. Cl.
*B25J 9/16* (2006.01)
*H04W 4/70* (2018.01)

(52) U.S. Cl.
CPC ............. *B25J 9/1664* (2013.01); *H04W 4/70* (2018.02); *Y10S 901/01* (2013.01)

(58) Field of Classification Search
CPC .... B25J 9/1664; Y10S 901/01; G05D 1/0027; G05D 1/0274; G05D 2201/0207; G05D 2201/0218

(Continued)

(56) References Cited

U.S. PATENT DOCUMENTS 6,408,226 B1 6/2002 Byrne et al.
6,687,571 B1 2/2004 Byrne et al.

(Continued)

OTHER PUBLICATIONS

M. Batalin et al., "Coverage, Exploration and Deployment by a Mobile Robot and communication Network" Proceedings of the International Workshop on Information Processing in Sensor Networks, Apr. 2003, pp. 376-391.

(Continued)

*Primary Examiner* — Dalena Tran
(74) *Attorney, Agent, or Firm* — Oblon, McClelland, Maier & Neustadt, L.L.P.

(57) ABSTRACT

Described herein is a method of deploying sensors by a robot in a geographical region. The robot receives a first instruction including information corresponding to the geographical region and a second instruction indicating one of a first manner and a second manner of deploying sensors. The robot computes a path to traverse the region in a plurality of steps, each step of the plurality of steps having a predetermined magnitude. The robot traverses until a stopping condition is satisfied. The robot deploys sensors at each traversed step size and further receives from each deployed sensor, information indicating absence of sensors in a neighboring area of the deployed sensor. Additionally, the robot repeats the traversing and deploying of sensors in the neighboring area to provide full coverage.

10 Claims, 23 Drawing Sheets

Related U.S. Application Data

(60) Provisional application No. 62/299,867, filed on Feb. 25, 2016.

(58) Field of Classification Search
USPC ....... 700/257, 258; 701/2, 24, 117; 134/172, 134/56 R; 901/1, 46
See application file for complete search history.

(56) References Cited

U.S. PATENT DOCUMENTS

| | | |
|---|---|---|
| 2005/0145018 A1 | 7/2005 | Sabata et al. |
| 2005/0216125 A1 | 9/2005 | Huston et al. |
| 2012/0036198 A1* | 2/2012 | Marzencki ............. H04B 17/27 709/206 |
| 2012/0197911 A1* | 8/2012 | Banka ................... G06F 16/951 707/752 |
| 2013/0242929 A1* | 9/2013 | Gorgen ............. H04W 72/0406 370/329 |
| 2013/0273938 A1* | 10/2013 | Ng ............................ G01S 5/06 455/456.1 |
| 2014/0047242 A1* | 2/2014 | Ukil ........................ H04L 9/083 713/171 |

OTHER PUBLICATIONS

T. Suzuki et al., "Deployment of Wireless Sensor Network using Mobile Robots to Construct an Intelligent Environment in a Multi-Robot Sensor Network" Advances in Service Robotics, Jul. 2008, pp. 315-329.

* cited by examiner

DEPLOYMENT METHOD FOR SENSORS IN A WIRELESS SENSOR NETWORK

CROSS-REFERENCE TO RELATED APPLICATIONS

The present application is a Continuation of Ser. No. 15/066,821, now allowed, having a filing date of Mar. 10, 2016 which claims priority to U.S. provisional application No. 62/299,867, having a filing date of Feb. 25, 2016, the entire contents of which are incorporated herein by reference.

FIELD OF INVENTION

The present disclosure relates generally to an energy efficient, wireless mobile sensor deployment technique to monitor hazardous, uneven, and obstacle prone areas, where human intervention is cumbersome.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Wireless sensor network (WSN) include a large number of sensor devices that are enabled with microchips that and are powered by limited energy source (e.g., small batteries). The sensor devices communicate with each other and other authorized devices via wireless links. As described by I. F. Akyildiz et. al. in "Wireless sensor networks: a survey," Computer networks, vol. 38, no. 4, pp. 393-422, 2002, which is incorporated herein by reference in its entirety, WSNs are used widely in numerous applications including event monitoring, detection, control of environment, temperature sensing, humidity sensing, oil and gas exploration, toxic gas emission detection, traffic control, manufacturing and plant automation, military surveillance and the like.

As described by M. Dunbabin et. al. in "Data mulling over underwater wireless sensor networks using an autonomous underwater vehicle," in Robotics and Automation, 2006. ICRA-IEEE, 2006, pp. 2091-2098, which is incorporated herein by reference in its entirety, sensors can be both static and autonomous based on the application domain. Hybrid sensor networks can be more energy efficient, wherein static sensors are only responsible for sensing data from environment and autonomous devices are responsible for relocation of the sensors, data aggregation, maintenance, and the like. Autonomous devices refer to the actuators or the robotic agents who are resource rich in terms of battery power, movement features and the like. In contrast, static wireless sensors are very tiny in shape and have limited resources. Thus, the small sensors deplete energy quickly if they have to perform movement, maintenance and repair, which are not feasible for real life application scenarios.

Numerous techniques have been proposed for robot assisted sensor deployment. All such robot assisted techniques rely on the prior knowledge of their position i.e. through GPS and many of such techniques are not efficient enough to cover a region-of-interest (ROI) completely.

Another approach for sensor deployment is the Back-Tracking Deployment (BTD). The BTD approach considers a single robot which moves forward along a virtual grid with a predefined order of precedence until it reaches dead-end and then back-tracks to the nearest empty vertex. Further, molecule spreading concepts from physics are used to deploy sensors without the availability of global information. Self-deployment by density control (SDDC) technique focuses on the density control by each node for concurrent deployment of sensor nodes. The area density balance is maintained by forming clusters from the nodes. The SDDC technique has been shown to perform better than corresponding incremental self-deployment techniques.

Another approach for sensor deployment is the distributed hash table scheme as described by F. Dressier and M. Gerla, in "A framework for inter-domain routing in virtual coordinate based mobile networks," Wireless networks, vol. 19, no. 7, pp. 1611-1626, 2013, and incorporated herein by reference in its entirety. In this work, the authors describe a technique of implementing inter-domain routing using appropriate indirections based on their virtual cord protocol (VCP). However, such a technique was shown to be inefficient in finding optimal routes over multiple transit networks. Accordingly, G. Fletcher et. al. in "Back-tracking based sensor deployment by a robot team," in Sensor Mesh and Ad Hoc Communications and Networks (SECON), 2010 7th Annual IEEE Communications Society Conference on. IEEE, 2010, pp. 1-9, which is incorporated herein by reference in its entirety, proposed a new framework for optimized inter-domain routing. In particular, an ant colony optimization technique was implemented to optimize routes between multiple network domains.

Batalin and Sukhatme proposed the Least Recently Visited (LRV) algorithm in "Coverage, exploration and deployment by a mobile robot and communication network," Telecommunication Systems, vol. 26, no. 2-4, pp. 181-196, 2004, which is incorporated herein by reference in its entirety, wherein already deployed sensors provide recommendations to robots for the direction to continue sensor placement. The algorithm produces full sensing coverage in a long run, but it incurs excessive robot movements to explore the ROI, and often faces termination problems.

Chang et al. designed a novel algorithm for sensor deployment in unpredictable region using the concept of spiral movement of robots in "Obstacle-resistant deployment algorithms for wireless sensor networks," Vehicular Technology, IEEE Transactions on, vol. 58, no. 6, pp. 2925-2941, 2009 and "An obstacle-free and power-efficient deployment algorithm for wireless sensor networks," Systems, Man and Cybernetics, Part A: Systems and Humans, IEEE Transactions on, vol. 39, no. 4, pp. 795-806, 2009, each of which is incorporated herein by reference in their entirety. The work by Chang proposes a Snake-Like Deployment (SLD) algorithm which may be of good contribution in the sensor deployment area as it focuses on deployment as well as the energy efficiency of the robots and sensors. However, a critical drawback of the algorithm is that it cannot guarantee full area coverage.

Santpal S and Krishnendu proposed two algorithms for efficient placement of sensors in a sensor field in their work of "Sensor placement for effective coverage and surveillance in distributed sensor networks", IEEE 2003, vol. 3, which is incorporated herein by reference in its entirety. The main focus of their work was to develop an algorithm which would optimize the process of placing the minimum number of sensors with maximum coverage. The authors proposed a sensor detection model based on probabilistic mathematics according to which the probability of detection of a target by a sensor varies exponentially with the distance between the target and the sensor. However, the proposed framework proves to be unreliable due to the unreliable nature of the probabilistic results.

Howard et al. proposed in their work "An incremental self-deployment algorithm for mobile sensor networks," Autonomous Robots, vol. 13, no. 2, pp. 113-126, 2002, which is incorporated herein by reference in its entirety, an incremental self-deployment strategy wherein a robot deploys the sensors in an unknown environment, one at a time and incrementally retrieves the next sensor location information from a central controller based on previously deployed sensor. However, this approach is very expensive and non-robust as the entire processing for the sensor position is done by the centralized controllers which would be highly computationally expensive. Also, if the central controller fails, then the entire ROI would be disconnected.

Wang et al. proposed a greedy solution for placing the sensor devices in a certain region for maximum coverage in their work, "Robot-assisted sensor network deployment and data collection," Computational Intelligence in Robotics and Automation, 2007. CIRA 2007. International Symposium on. IEEE, 2007, pp. 467-472, which is incorporated herein by reference in its entirety. The main drawback of this solution was that it was GPS based framework that wouldn't work in the absence of a positioning system. Further, the maximum coverage problem was not solved as they only considered a fixed number of points called interest points.

Li et al. proposed in their work "An extended virtual force-based approach to distributed self-deployment in mobile sensor networks," International Journal of Distributed Sensor Networks, vol. 2012, 2012, which is incorporated herein by reference in its entirety, an extended virtual force-based approach in distributed self-deployment of mobile sensor networks where their work covered the self-deployment of mobile sensor networks with stochastic distribution of nodes. The authors extended the VFA algorithm to achieve sensor deployment.

Movement-assisted sensor deployment provides optimal solution while deploying sensors from an initial unbalanced state to a balanced state. Various parameters such as travelled distance, number of moves and the like can be optimized with either centralized or localized methods. One Hungarian-algorithm based centralized and one movement based localized SMART (Scan-based Movement-Assisted Sensor Deployment) is used to further extend SMART and detect communication holes in sensor network in.

Tuna et al. proposed an algorithm in "An autonomous wireless sensor network deployment system using mobile robots for human existence detection in case of disasters," *Ad Hoc Networks*, vol. 13, pp. 54-68, 2014, which is incorporated hereby by reference in its entirety. Th algorithm named SLAM (Simultaneous Localization and Mapping) for sensor deployment by multiple robot agents to detect human existence in case of disasters. However, the process uses probabilistic method to determine the exploration map for the sensor deployment with the help of different sequence of landmarks from moving robots.

Broadcasting from static to mobile (BSM) protocol is used to provide seamless communication between source and destination without the necessity of connected dominating set (CDS), blind flooding, and hyper flooding. For instance in the work by I. Stojmenovic, "A general framework for broadcasting in static to highly mobile wireless ad hoc, sensor, robot and vehicular networks." in *ICPADS*, S. Khuller, M. Purohit, and K. K. Sarpatwar, in "Analyzing the optimal neighborhood: Algorithms for budgeted and partial connected dominating set problems." in *SODA*. SIAM, 2014, pp. 1702-1713 and in the work of M. Nandi, A. Nayak, B. Roy, and S. Sarkar, "Hypothesis testing and decision theoretic approach for fault detection in wireless sensor networks," International Journal of Parallel, Emergent and Distributed Systems, pp. 1-24, 2014, and A. A. Khan, I. Stojmenovic, and N. Zaguia, "Parameterless broadcasting in static to highly mobile wireless ad hoc, sensor and actuator networks," in Advanced Information Networking and Applications, 2008. AINA 2008. 22nd International Conference on. IEEE, 2008, pp. 620-627, each incorporated herein by reference in their entirety, timely delivery of warning in vehicular networks is shown without the usage of road maps. Note that the above described works can be employed among the mobile actuators for seamless coordination while deploying sensors in specific ROIs.

Total number of sensors required to provide minimum predefined lifetime for a certain network is determined with a NP-hard problem formulation by H. Liu et al. in "Minimum-cost sensor placement for required lifetime in wireless sensor-target surveillance networks," Parallel and Distributed Systems, IEEE Transactions on, vol. 24, no. 9, pp. 1783-1796, 2013, which is incorporated herein by reference in its entirety. Lower bound on minimum number of sensors is calculated which demonstrated close-to-optimal solution.

Corke et al. mentioned one approach of sensor deployment using unmanned aerial vehicle (UAV) which was one of the early approaches in "Autonomous deployment and repair of a sensor network using an unmanned aerial vehicle," Robotics and Automation, 2004. Proceedings. ICRA '04. 2004 IEEE International Conference on, vol. 4. IEEE, 2004, pp. 3602-3608, and is incorporated herein by reference in its entirety. In this framework, the authors used AVATAR (an autonomous helicopter) for sensor deployment and repairing. They deployed 50 sensor nodes using AVATAR on a grass field marked as 7-grid. They compared their result using both manual and autonomous mode. It was determined that two passes of AVATAR were required for deploying and subsequently repairing the sensor network.

Self-deployment of sensors (as described by M. Erdelj et al. in "Covering points of interest with mobile sensors," Parallel and Distributed Systems, IEEE Transactions on, vol. 24, no. 1, pp. 32-43, 2013, which is incorporated herein by reference in their entirety), over a POI (Point of interest) and keeping inter-connection among the neighboring sensors is one of the complex issues. Additionally, keeping in touch with the base station is also a major constraint. POI deployment algorithm (PDA) is defined to overcome these issues by keeping communication with the neighboring sensors which are part of the relative neighborhood graph (RNG), chosen to provide global solution locally.

Sensor devices can act autonomously while collecting data in various forms as described by Younis and K. Akkaya in "Strategies and techniques for node placement in wireless sensor networks: A survey," Ad Hoc Networks, vol. 6, no. 4, pp. 621-655, 2008, which is incorporated herein by reference in its entirety. The sensor devices have the capability to deliver the sensed data to some other location via wireless communication. In doing so would require an additional budget to keep the network up and alive for longer period of time. Researchers have come up with the hybrid approach so that sensors only have to get the data, other tasks will be carried out by the mobile robot devices. The mobile robots are responsible for deploying the sensors to some desired locations, replacing the faulty nodes, recharging the low charged sensors, data aggregation etc.

In particular, mobile actuators or robots are also equipped with different sensory devices like camera, laser beams, acoustic signals, local memory, communication devices etc. The equipment aids the robots to act autonomously for the sake of helping the sensors. However, it must be noted that wireless sensor and robot networks' first and foremost challenge is to deploy the sensors in their desired location so that sensors can easily perform their static job. On the other hand, robots perform the monitoring and maintenance task after deploying them to the calculated place (i.e., rather than being precomputed, the sensor locations are dynamically computed by the robot).

In most situations, static sensor placement may be feasible, but there are some mission critical applications which need mobile sensing. For instance, if we want to monitor some areas where it is impossible (if not difficult) for humans to access, then sensor deployment via robots is a good choice. Sometimes the area where the sensors need to be deployed is filled with obstacles and GPS maybe unavailable due to unavoidable reasons. Thus, there may be a requirement for a deployment mechanism which can deploy the sensors in the hazardous area without the need of GPS.

Accordingly, the present disclosure describes techniques of sensor deployment that address the above described drawbacks and limitations while providing for a scalable, robust, maximum-coverage, GPS-less and deadlock-free deployment framework.

SUMMARY

An aspect of the present disclosure provides for a method of deploying sensors by a robot in a geographical region, the method comprising: receiving from a server, a first instruction including information corresponding to the geographical region, the information including at least a plurality of boundary locations of the geographical region and a first coordinate of the geographical region corresponding to a starting location for sensor deployment; receiving from the server, a second instruction indicating one of a first manner and a second manner of deploying sensors in the geographical region; computing by circuitry, based on the second instruction, a path to traverse the geographical region in a plurality of steps, each step of the plurality of steps having a predetermined magnitude, the traversing being performed until one of a first stopping criteria corresponding to the first manner of deploying sensors and a second stopping criteria corresponding to the second manner of deploying sensors being satisfied: deploying sensors in the geographical region at each traversed step size; receiving from each deployed sensor, information indicating absence of sensors in a neighboring area of the deployed sensor; and repeating the traversing and deploying of sensors in the neighboring area based on the received information.

Another aspect of the present disclosure provides for a non-transitory computer readable medium having stored thereon a program that when executed by a computer, causes the computer to execute a method of deploying sensors by a robot in a geographical region, the method comprising: receiving from a server, a first instruction including information corresponding to the geographical region, the information including at least a plurality of boundary locations of the geographical region and a first coordinate of the geographical region corresponding to a starting location for sensor deployment; receiving from the server, a second instruction indicating one of a first manner and a second manner of deploying sensors in the geographical region; computing based on the second instruction, a path to traverse the geographical region in a plurality of steps, each step of the plurality of steps having a predetermined magnitude, the traversing being performed until one of a first stopping criteria corresponding to the first manner of deploying sensors and a second stopping criteria corresponding to the second manner of deploying sensors being satisfied; deploying sensors in the geographical region at each traversed step size; receiving from each deployed sensor, information indicating absence of sensors in a neighboring area of the deployed sensor; and repeating the traversing and deploying of sensors in the neighboring area based on the received information.

According to another aspect of the present disclosure is provided a sensor deploying device comprising circuitry configured to receive from a server, a first instruction including information corresponding to the geographical region, the information including at least a plurality of boundary locations of the geographical region and a first coordinate of the geographical region corresponding to a starting location for sensor deployment, receive from the server, a second instruction indicating one of a first manner and a second manner of deploying sensors in the geographical region, compute, based on the second instruction, a path to traverse the geographical region in a plurality of steps, each step of the plurality of steps having a predetermined magnitude, the traversing being performed until one of a first stopping criteria corresponding to the first manner of deploying sensors and a second stopping criteria corresponding to the second manner of deploying sensors being satisfied, deploy sensors in the geographical region at each traversed step size, receive from each deployed sensor, information indicating absence of sensors in a neighboring area of the deployed sensor, and repeat the traversing and deploying of sensors in the neighboring area based on the received information.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION OF EMBODIMENTS

Figure 1:
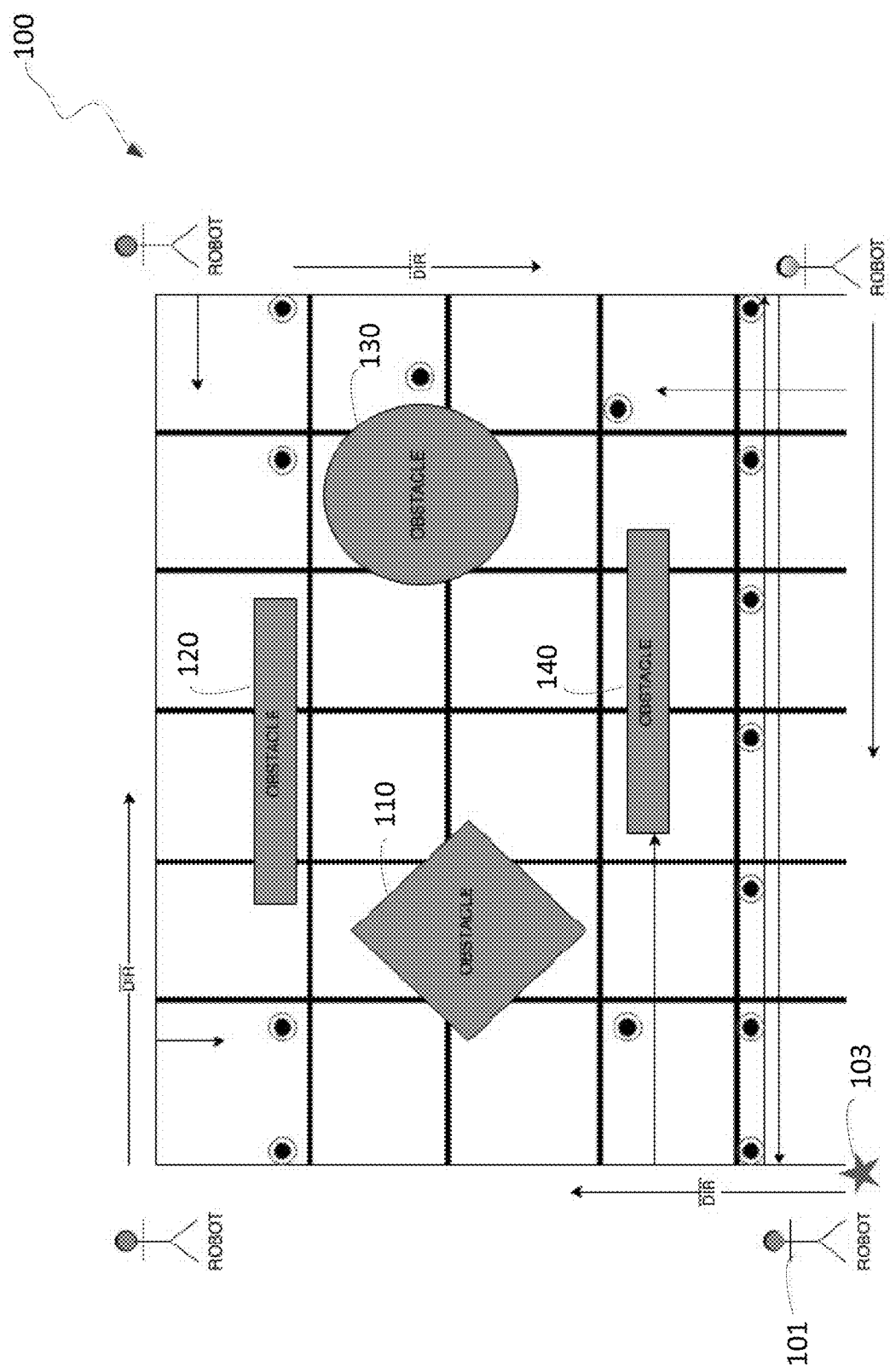
FIG. 1 illustrates an exemplary geographic region including obstacles wherein sensors are to be deployed.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

In what follows are described robot assisted energy efficient wireless mobile sensor deployment techniques to monitor hazardous, uneven, and obstacle prone areas where human intervention is cumbersome. The techniques are designed to exploit the operation in two steps. Initially, the robot deploys the mobile sensors in suitable positions by exploring the intended region in two ways referred to herein as a basic scalable coordinate accumulation network (basic-SCAN) and opportunistic-SCAN. In basic-SCAN, the robot explores the intended area using simple to install sensors. In contrast, in opportunistic-SCAN, the robot explores the intended area and installs the sensors whenever possible and further remains in that region to cover as much of the region as possible. Additionally, the installed sensors run coverage algorithm to provide information about the empty neighborhood to the running robot. Initially, the robot starts from some reference point and deploy sensors avoiding any obstacles or boundary without the help of GPS. Combining these algorithms with the coverage algorithm guarantees maximum coverage for different obstacle distributions and for different regions of interest (ROI).

According to one embodiment, motivation for designing the SCAN techniques is driven by four major observations from different contemporary researches on sensor deployment. It must be appreciated that although SCAN focuses on particular application areas such as deployment of sensors in an indoor area with obstacles, SCAN can be used in other scenarios as well.

Firstly, there are places where human reachability can be hazardous due to adverse environmental condition, toxic gas explosion from industries, unused and abandoned places where toxic chemical properties may remain for longer period of time. These places can be explored using robotic agents to avoid the adverse effect on human. SCAN can be implemented on robots to accomplish these tasks efficiently.

Secondly, most of the research in the area of sensor deployment is based on the usage of a GPS location service. Although GPS is most widely used for object tracking, location determination, geographic information collection, and the like, it cannot be accessible inside the buildings. Thus, if one wants to deploy sensors within some buildings via mobile robots, the task becomes difficult, if not impossible. Additionally, location calculations would add an extra processing overhead for the robot. The SCAN technique described herein is a best fit for such reasons, as it does not require any GPS service for calculating the position of the robot. SCAN only requires an initial starting co-ordinate from where the robot starts to move and the maximum boundary location for sensor deployment. At each step, the robot computes its position with reference to its original starting point. Thus, SCAN resolves the hard and fast rule of having GPS.

Thirdly, coverage is one of the most important factors to measure the performance of any deployment algorithm. Additionally, maximum coverage is desirable from every deployment algorithm, as otherwise the uncovered areas remain abandoned and no information can be collected from those locations. As such, the task becomes more sophisticated when the desired deployment area includes obstacles. In this scenario, SCAN ensures maximum coverage for different obstacles distribution as well.

Fourthly, scalable sensor deployment techniques have to be executed on the robot so that it can provide similar performance for increased area and number of obstacles. SCAN overcomes this issue by including an opportunistic behavior feature. In doing so, the SCAN technique ensures maximum coverage for increased area of deployment region and for arbitrary number of obstacles as well. It must be appreciated that scalability is an important requirement as the robots do not know the obstacles position before facing them.

Additionally, the deployment technique must be capable of tackling any dead-end scenarios while the robot moves. To address this issue, backtrack based algorithms maintain a back pointer that is used when any obstacle is faced. However, there are several situations when the back pointer is removed by other robots. The pointer removal can create dead-end for the current robot that owned the back pointer previously. SCAN ensures that this sort of scenario never occurs by implementing an opportunistic approach in which the robot attempts to find any available route before going back to the starting position on its route when any obstacle is faced.

Turning now to FIG. 1 is illustrated an exemplary scenario 100 depicting a geographical region (for instance, the inside of a building) including obstacles wherein sensors are to be deployed. The building may include toxic gas elements which may make the deployment of sensors by a human infeasible.

As shown in FIG. 1, robot 101 is employed to deploy static sensors 104 inside the building in an autonomous fashion. The deployed sensors 104 collect data from the environment and transmit back to a command and control center (CAC) using multi hop communication. The robot upon receiving a command from the CAC initiates the process of exploring the building.

The command and control center is referred to hereinafter as CAC, the robot is referred to hereinafter as R, and set of sensors are denoted as $S_r$. In order to initiate the process of deploying the sensors, the robot R receives from the CAC, the starting co-ordinate within the building, the maximum boundary, and the set of sensors that are available for deployment sensors as its basic configuration. By one embodiment, the sensing range of the sensor is denoted as $S_r$, which is used as a step size for the robot to move forward. It must be appreciated that the sensing range of each sensor may be unique or assumed to be a constant.

FIG. 1 represents the building including walls as obstacles 110-140, respectively. The entrance is denoted as * (103) for the robot. The robot enters the building from * (co-ordinate of which are provided by the CAC) and moves up adding $S_r$. Further, the robot moves right and deploys sensors while assigning a sensor id (sensor id's are assigned increasingly starting from 1) to each sensor. The robot maintains the previous position of the placed sensors in its local memory while moving on to the next one for further validation and tracking. As will be described later the robot faces an obstacle after moving some distance ($n \times S_r$, n=1, 2, 3 . . . ). Note that the sensor deployment as shown in FIG. 1 depicts only the initial phase of the SCAN technique. Details pertaining to the SCAN technique and enhancements (SCAN with a focused coverage feature) thereof are described later.

Figure 2:
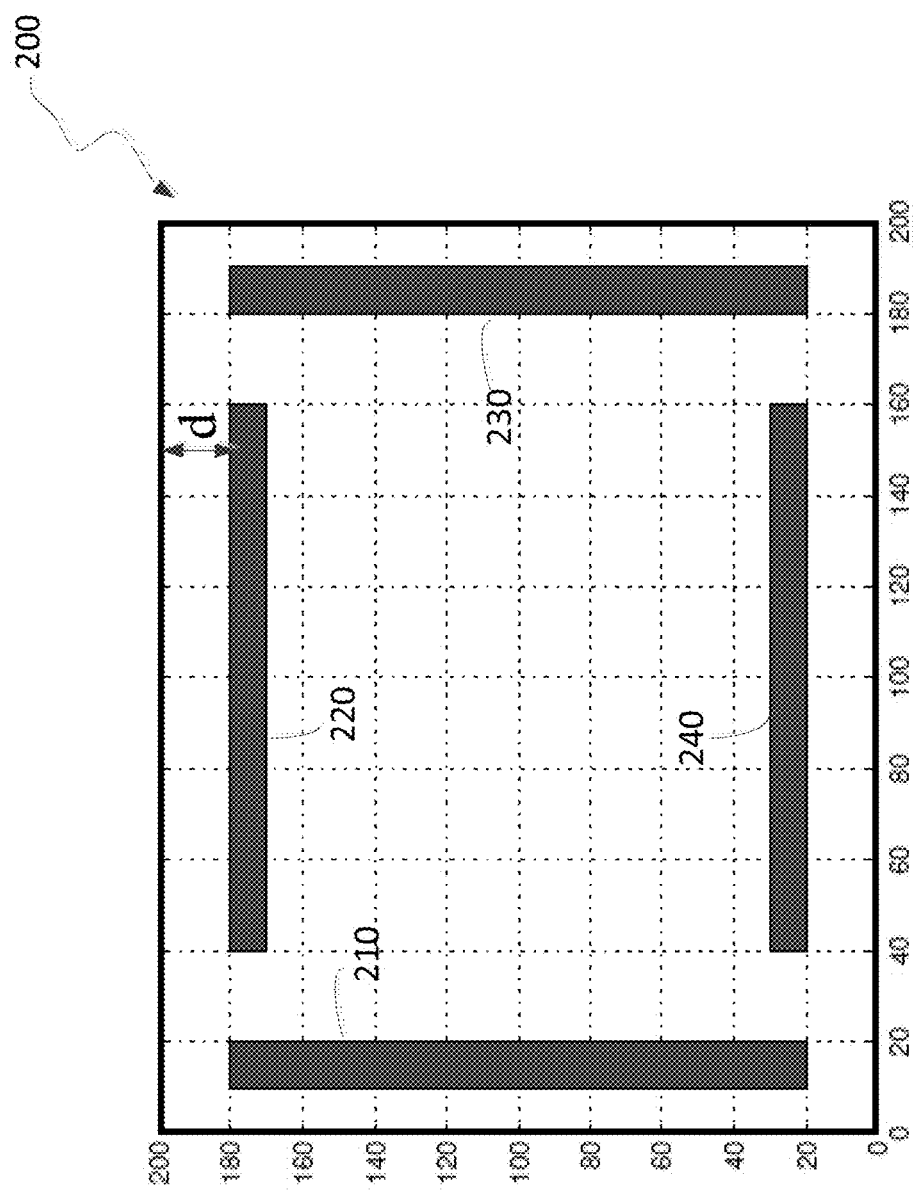
FIG. 2 depicts an exemplary geographical region including obstacles positioned in close proximity to a boundary of the region.

FIG. 2 depicts an exemplary geographical region 200 wherein the obstacles 210-240 are positioned in close proximity to the boundary of the region. Referring to FIG. 2, note that it is quite impossible (due to the location of the obstacles) for the robot to enter into the intended area for sensor deployment. So, if all of the obstacles are positioned at the close proximity of the boundary region, the robot will encounter the obstacles and go back to the boundary position, whereinafter the robot may add the sensing range of the sensors to move forward to the next suitable position for the sensors to be deployed. In this way, the robot may travel all the way from the starting point and back without even entering into the main deployment area.

Additionally, if the distance (d) between boundary and the obstacle is less than the sensing range, then the robot will come back to starting point without placing any sensor. So, there will be no single sensor in the field which will further call for robots to perform re deployment. It must be appreciated that as there are no sensor placed upon an initial traversal by the robot, no execution of focused coverage is performed. According to one embodiment, this issue is solved by again sending the robot to the field with a decreased sensing range. The process is repeated until any sensor is placed in the intended region. Once a single sensor is placed, it can get the information about the empty neighborhood which is not yet covered by the robot. In contrast, when the distance (d) is more than the sensing range, the robot performs a normal deployment of sensors by one of techniques described herein.

Figure 3:
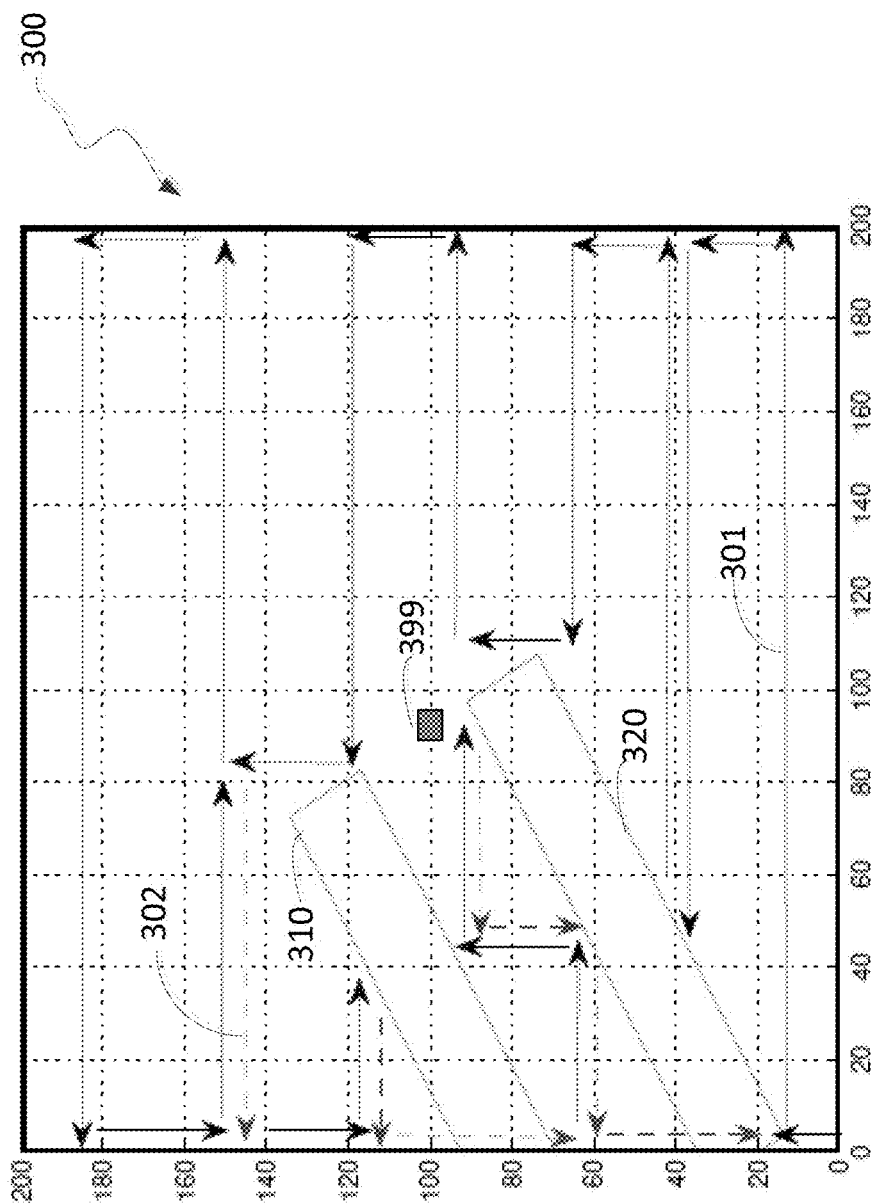
FIG. 3 depicts an exemplary geographical region including slanting obstacles.

Turning to FIG. 3, is depicted a geographical region 300 including slanting obstacles. As will be described further, as the SCAN technique ensures both horizontal and vertical coordinate accumulation and placement, the ideal placement of obstacles would also be horizontal and vertical. However, the SCAN technique of sensor deployment may incur a problem based on the orientation of the obstacles within the geographical region. FIG. 3 depicts an exemplary scenario wherein obstacles 310 and 320 are not placed ideally with respect to the robot movement. Both the obstacles are slanted. Thus the Basic-SCAN technique cannot access the area between the obstacles 310 and 320. By one embodiment, this issue is solved by implementing an opportunistic SCAN sensor deployment technique. The path followed by the SCAN is shown by solid line 301, whereas the path followed by opportunistic SCAN is shown by the dashed arrow path 302.

The basic SCAN technique can traverse back its path whenever it finds any obstacle. In this sense the SCAN technique of sensor deployment may be thought of as a protective mechanism of sensor deployment. On the other hand, opportunistic SCAN technique uses maximum availability of routes and does the exploration in efficient way.

Specifically, referring to FIG. 3, if the robot comes to the location (0, 60) then it will follow the black arrow on the positive x-axis. Now, basic SCAN would make the robot go back directly to position (0, 60) on the first encounter of the slanted obstacle. But, opportunistic SCAN takes it till the gray rectangle 399, where it deploys a sensor and waits for some threshold time to look for any path. If the robot does not find any path, it returns to (0, 60) and resumes for further deployment.

Figure 4:
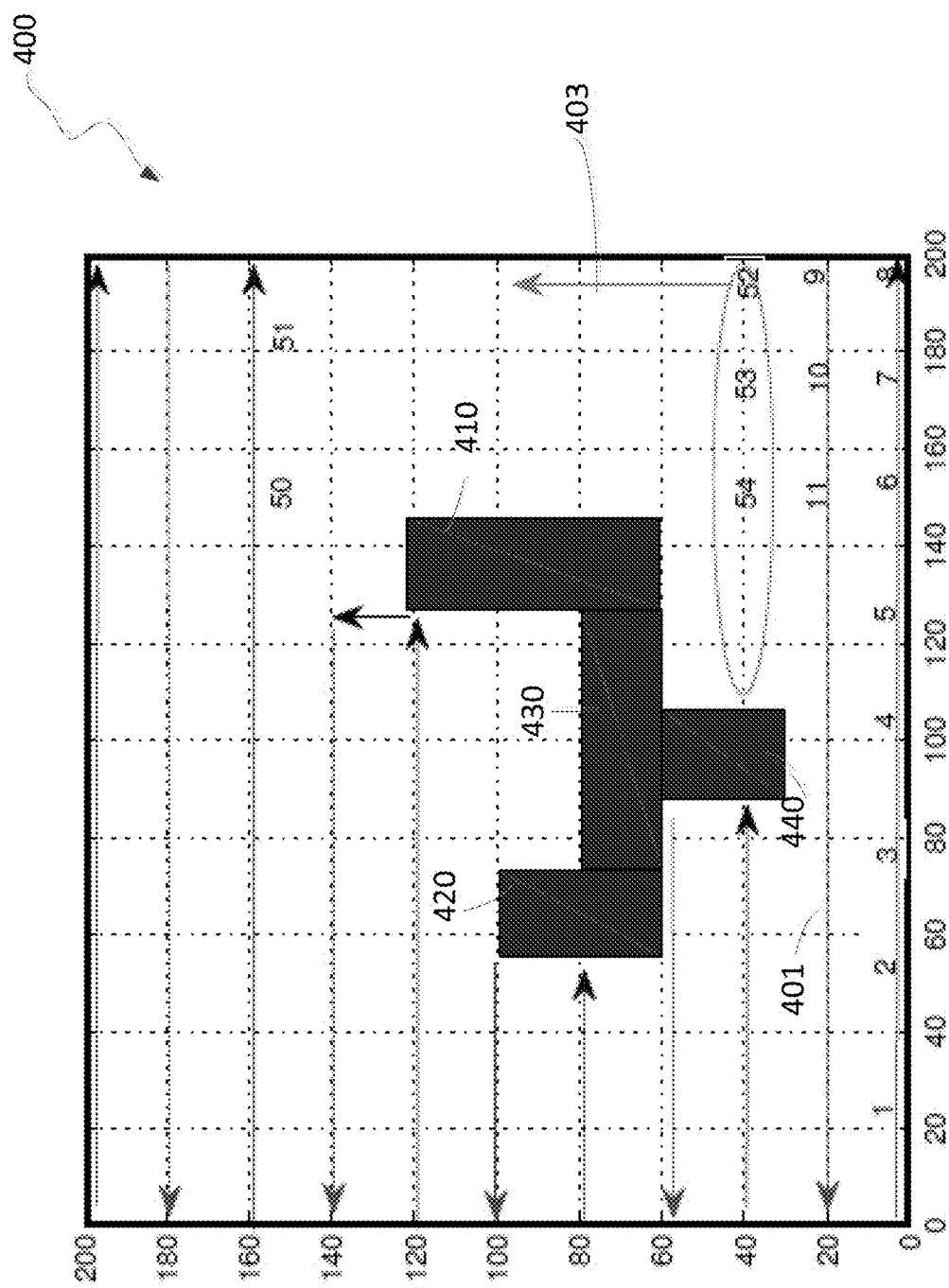
FIG. 4 depicts a geographic region illustrating the deployment of sensors using the SCAN technique with focused coverage.

FIG. 4 depicts a geographic region 400 illustrating the deployment of sensors using the opportunistic SCAN technique with focused coverage. The region includes obstacles that are denoted as 410-440. The path taken by the robot while implementing the opportunistic SCAN is depicted as path 401. As shown in FIG. 4, consider the scenario where 51 sensors are placed using phase one (SCAN) and the rest are deployed using phase two. According to one embodiment, focused coverage deploys sensors in areas within the geographical region, wherein sensors could not be deployed by the SCAN technique.

It can be noted from FIG. 4 that sensor nodes with ids 9, 10, and 11, each have empty neighbors. Thus they will be responsible for alert notification initiator for the command and control center (CAC). Additionally, for sake of simplicity, the nodes are placed on the same line, thus the node with the smaller ID will be responsible for sending the empty neighbor notification message to the command and control center. In this particular case, as shown in FIG. 4, theoretically node 9 sends the alert message, which in turn notifies the robot to deploy sensors in the empty spaces from phase one. So, next sensor placement starts from position 52, and SCAN is performed again treating that as the new origin.

Further, consider the scenario that all the nodes with ID 9, 10, and 11 are damaged due to some unavoidable reason. So, the corresponding neighbors from both lower and upper rows will sense this empty event. Nodes 52, 53, 54 and 6, 7, 8 will sense empty neighborhood. According to one embodiment, the node with the minimum node is in the particular region will be responsible for alert notifications. Specifically, as node 6 has the minimum ID among all the six nodes, its message will reach first to the control center.

Furthermore, consider another scenario where nodes from more than one consecutive row fails then the above process may not maintain this failure. For instance, if nodes 6, 7, 8 and 9, 10, 11 are down, then nodes with ID 52, 53 and 54 cannot communicate with control center using focused coverage algorithm where message is sent from one node to another using descending order of their corresponding ID's assigned by the robot. In this case, by one embodiment, node 52 has to send message to its above neighboring nodes, as depicted by the green arrow (403) in FIG. 4. Accordingly, the message transfer would take longer time compared to the focused coverage method. By one embodiment, reduction in the longer path can be achieved by increasing the sensing range of the source node. In this case, node 52 will increase its range to find available neighbor node whose ID is smaller than itself. In this manner, by adjusting either the sensing range of the sensors or by incurring a longer path to traverse to the CAC, multi-level failures can be managed.

According to one embodiment, the sensor deployment techniques described herein overcome the key challenges in the field of robot assisted sensor deployment in hazardous area. A key feature of the sensor deployment strategies described in the present disclosure is the use of non-GPS based techniques in deploying the sensors. By one embodiment, the process of deploying sensors may be divided into two major parts: a first phase that defines the sensor deployment using non-GPS Backtracking algorithm and a second phase that takes care of the decentralized, cooperative coverage and localization for heterogeneous mobile robots. Furthermore, the deployment techniques described herein also focus on sufficient grid coverage of the sensor field with minimum energy consumption.

By one embodiment, the sensor deployment techniques of the present disclosure consider the entire hazardous area to be the region of interest (ROI), which is further divided into equal sized virtual grids. The first phase, which is referred to herein as a deployment phase, targets the optimized placement of sensors considering the unpredictable locations and dimensions of any obstacles within the ROI. Furthermore, it is assumed that the robots have sufficient number of sensors to deploy. Initially each robot is responsible for sensor deployment in its specified virtual grid in the ROI. Robots lay sensory units independently and asynchronously which is governed by intelligent direction ranking feature of the SCAN technique.

Additionally, aspects of the present disclosure also include a variant of the F-coverage method that is employed after initial SCAN execution by the robot, to further detect the nodes with empty neighbor set. The nodes which have at least one neighbor location as empty prompt with a beacon signal that is propagated via multi hop communication to the source robot. By one embodiment, the notification to the CAC is performed by the sensor node that has the minimum id from the neighbor set of each step. Accordingly, the message is propagated to the start location. Additionally, it must be appreciated that there is one command and control center (CAC) that is responsible for collecting the required information from the robot.

By one embodiment, certain assumptions are made while implementing the sensor deployment techniques: (a) sensors sensing range may be adjustable depending on the position and placement of the sensors, (b) the obstacles are not joined with each other in order to create any circular or closed loop where robots cannot enter, (c) the robot has a directional antenna and can sense the obstacle using laser beam/acoustic signal. The robot keeps track of its moving co-ordinates in its local memory to ensure and avoid exceeding predefined boundary region, (d) the robot is aware of its initial starting location, as well as the maximum sensing range of the sensors which is needed to calculate robot's step length.

Figure 5A:
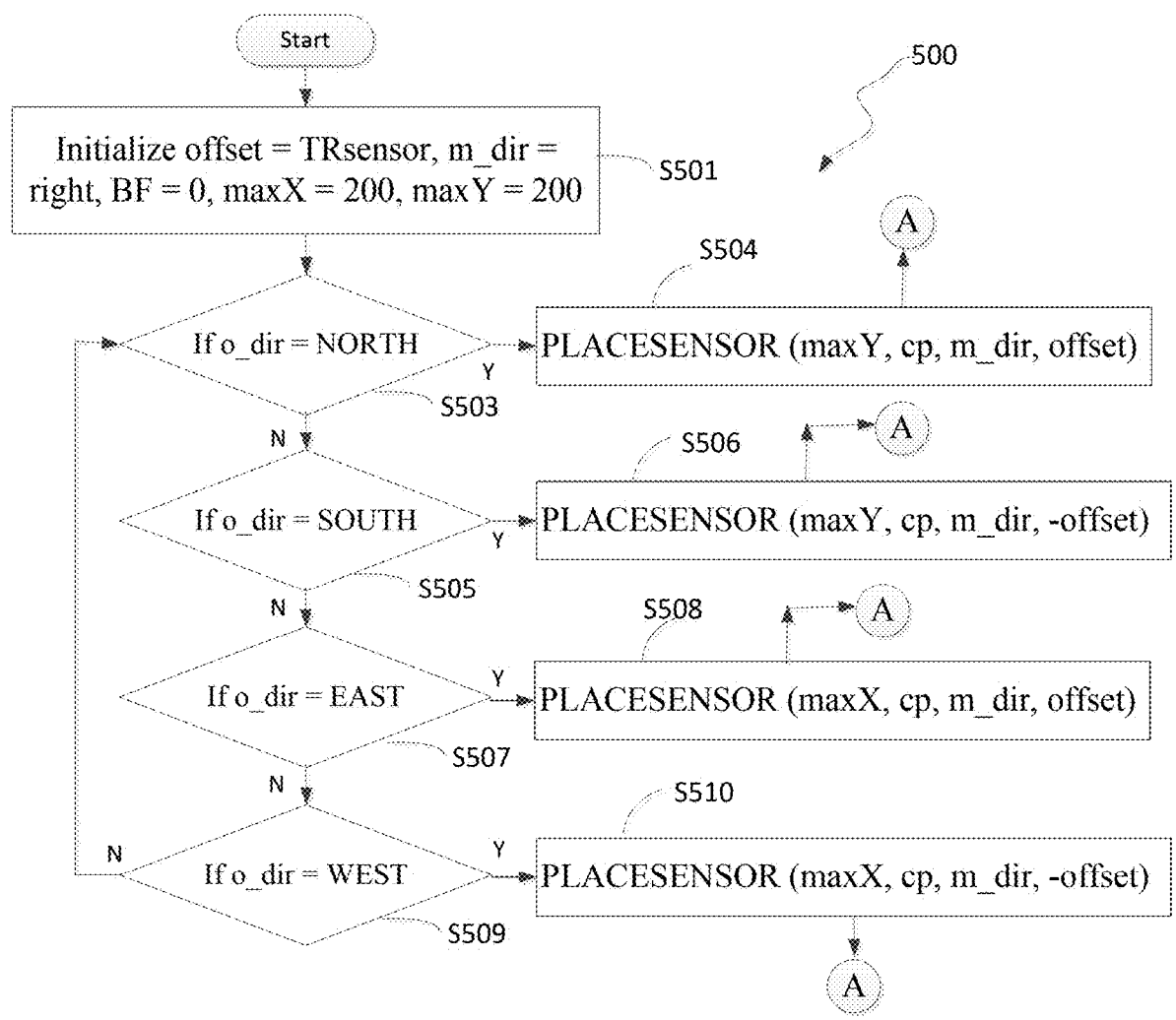
FIGS. 5A and 5B illustrate a flowchart depicting the steps performed in employing the SCAN sensor deployment strategy.
Figure 5B:
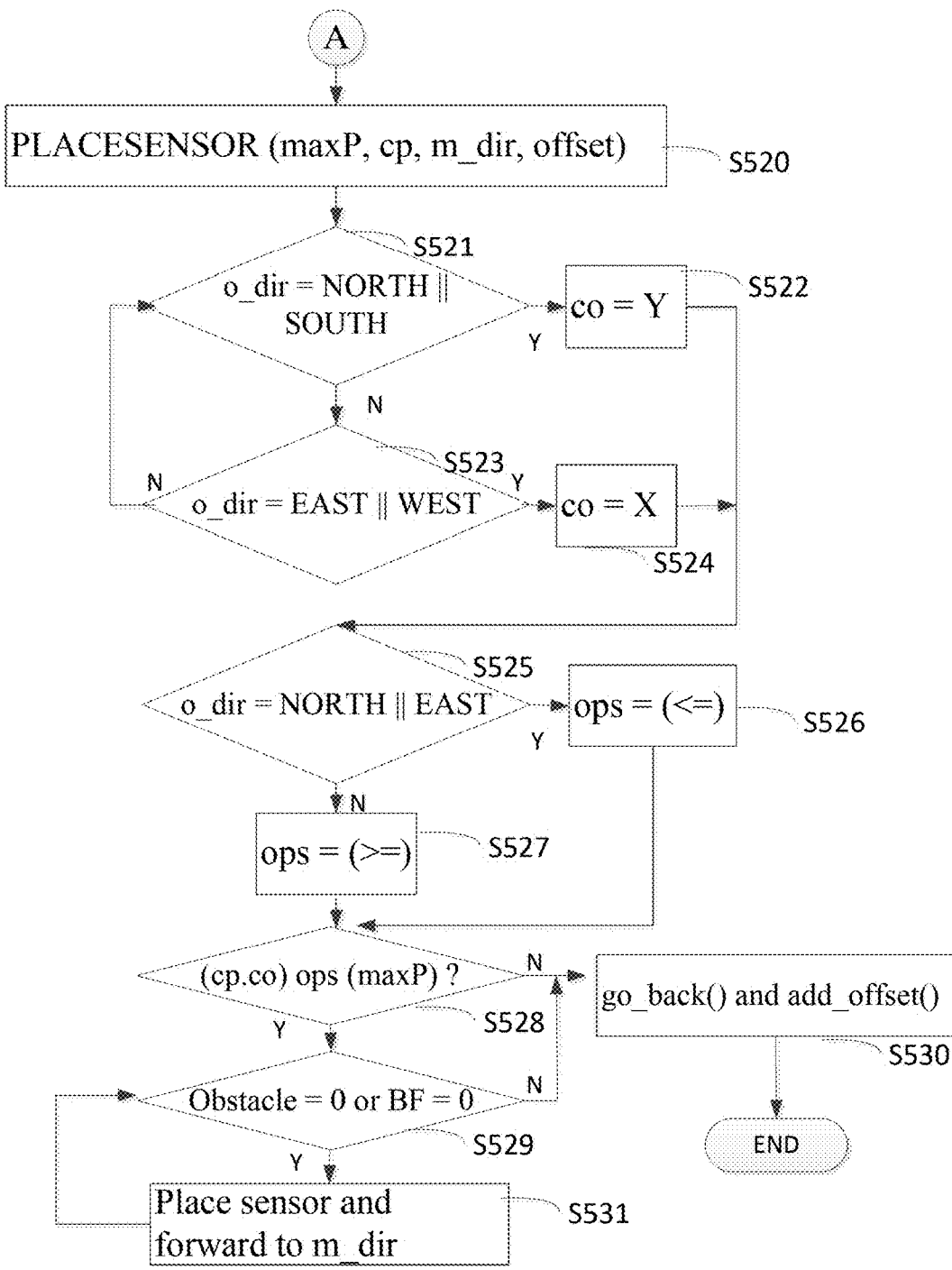
Figure 6:
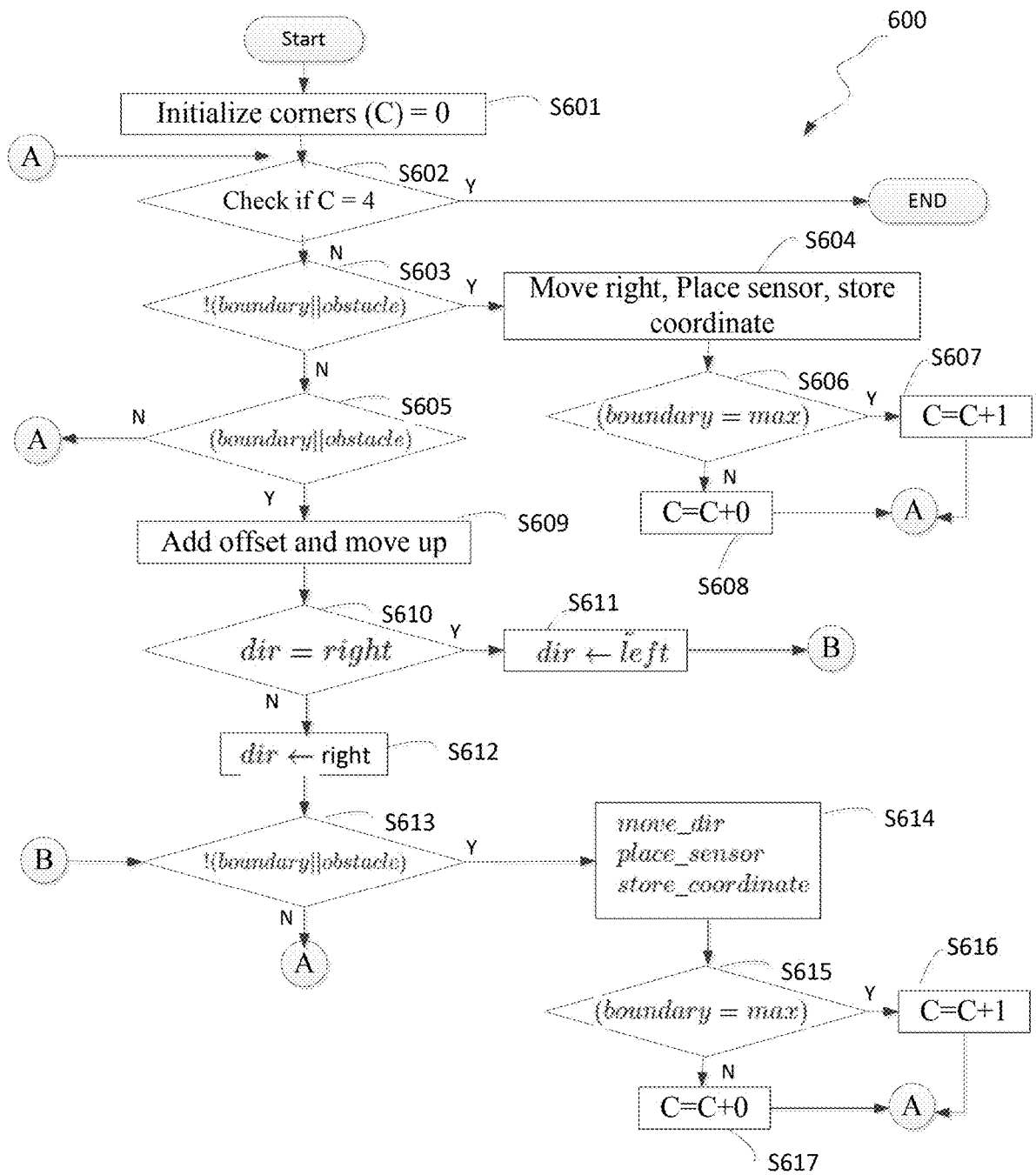
FIG. 6 illustrates a flowchart depicting the steps performed in employing an opportunistic SCAN sensor deployment strategy.

In what follows is first described several important features of the SCAN and opportunistic scan sensor deployment techniques, followed by a detailed description of the techniques with reference to FIGS. 5 and 6.

According to one embodiment, both SCAN and opportunistic SCAN ensure coverage guarantee for the intended ROI (region of interest).

Consider that the intended region of interest (ROI) requires s points for sensor placement excluding the obstacle regions. The robot moves from the origin to reach four corners to satisfy the initial stopping criteria and stores the travelled points in its own stack, m. It must be appreciated that the value of m has to be larger or equal to s to ensure that the ROI is covered with sensor deployment. In case of basic SCAN, m holds the set of points twice, m=2 $\{(p_1, p_2, p_3, \ldots, p_n\}$. Opportunistic SCAN holds the coordinates once except some situations where the only option to explore the new region is to go back to its previous path. It must be noted that the unique set of points are to be considered while comparing with the number of points to be explored. Equation (1) below provides the relationship of total travel distance for both SCAN and OPP-SCAN algorithm:

$$T_d = \sum_{i=1}^{m} D_i + \sum_{j=1}^{n} D_j + \sum_{k=1}^{p} D_k \tag{1}$$

wherein, $T_d$ denotes total travel distance, $D_i$ holds the values of the distance for initial m deployed sensors, $D_j$ and $D_k$ holds the distance from the FIND_HOLES procedure (described later with reference to FIG. 7). Thus, the total number of deployed sensors, $T_n$ can be computed by equation (2) as:

$$Tn = m + n + p \tag{2}$$

Thus, we can conclude that the following relationship is true:

$$Tn \geq s \tag{3}$$

The parameters s and m becomes equal when there is no obstacle (n, p both have null values). Specifically, one needs additional points to cover using FIND_HOLES when obstacle distribution is random. It must be appreciated that the robot's sensing range has to decrease in order to achieve the goal. Thus the initial intended number of points (s) does not match in those cases. Thus, the total number of points deployed in practical cases becomes equal or greater than the initial calculated points (s). Hence, the following relationship holds true:

$$m + n + p \geq s \tag{4}$$

Furthermore, by one embodiment, if the width and height of the ROI is m and n, then the maximum travel distance for SCAN and OPP-SCAN is $2n(m+1)/l+m$ and $n(m+1)/l+m$ respectively, where l is the sensing range. For instance, consider the width and height of the ROI is m and n units each. The robot has maximum sensing range of l units. If the robots deployment direction is towards height (n), then basic SCAN travels 2n distance before moving towards width (m). So, robot has to move m/l+1 times towards width with distance 2n and additional length m.

$$T_{scan}(\max) = 2n \times (m/l+1) + m \tag{5}$$

In the above equation, typically m/l>>1 results significant decrease of travel distance with the increment of l. On the other hand OPP-SCAN provides 50% reduced travel distance compared to basic SCAN.

$$T_{opp\_scan}(\max) = n \times (m/l+1) + m \tag{6}$$

For instance, if the width and height of ROI are both 8 units and sensing range is 2 units, then we can calculate the distance for both basic scan and opportunistic scan as follows:

$$T_{scan}(\max) = (2 \times 8) \times (8/2 + 1) + 8$$
$$= 16 \times 5 + 8$$
$$= 88$$

$$T_{opp-scan}(\max) = 8 \times (8/2 + 1) + 8$$
$$= 8 \times 5 + 8$$
$$= 48$$

According to one embodiment, the SCAN technique for sensor deployment is used for an initial deployment of the sensors, followed by a coverage technique to ensure total ROI coverage, and post deployment maintenance.

FIGS. 5A and 5B illustrates a flowchart 500 depicting the steps performed by the robot in employing the SCAN sensor deployment strategy.

In the flowchart of FIGS. 5A and 5B, variable offset is assigned the value of the robots sensing range ($TR_{sensor}$). Parameter m_dir has the moving directional value right, whereas parameters maxX and maxY both set to a predetermined number (e.g. 200 units) corresponding to the boundary of the region to be explored. The parameter o_dir refers to offset direction, co refers to coordinate, cp indicates current position, and the parameter BF indicates the boundary flag.

The process depicted in FIGS. 5A and 5B commences in step S501 wherein the parameters corresponding to the geographical region within which sensors are to be deployed are initialized. Specifically, by one embodiment, the parameters are initialized as offset=$TR_{sensor}$, m_dir=right, BF=0, maxX=200, maxY=200. Note that maxX and maxY represent the maximum magnitude (with respect to a reference position) in the x-axis direction and the y-axis direction, respectively.

The process then proceeds to step S503 wherein a query is made to determine whether the offset direction is pointing to the north. If the response to the query is affirmative, the process proceeds to step S504. If the response to the query is negative, the process proceeds to step S505. In step S503, the parameters for the PLACESENSOR function are set as: {maxY, cp, m_dir, offset} whereafter the process proceeds to step S520 to execute the place sensor function.

In step S505 a query is made to determine whether the offset direction is pointing to the south. If the response to the query is affirmative, the process proceeds to step S506. If the response to the query is negative, the process proceeds to step S507. In step S506, the parameters for the PLACESENSOR function are set as: {maxY, cp, m_dir, −offset} whereafter the process proceeds to step S520 to execute the place sensor function.

In step S507 a query is made to determine whether the offset direction is pointing to the east. If the response to the query is affirmative, the process proceeds to step S508. If the response to the query is negative, the process proceeds to step S509. In step S508, the parameters for the PLACESENSOR function are set as: {maxX, cp, m_dir, offset}, whereafter the process proceeds to step S520 to execute the place sensor function.

The process in step S509 makes a query to determine whether the offset direction is pointing to the west. If the response to the query is affirmative, the process proceeds to step S510. If the response to the query is negative, the process loops back to step S503. In step S510, the parameters for the PLACESENSOR function are set as: {maxX, cp, m_dir, −offset}, whereafter the process proceeds to step S520 to execute the place sensor function.

Upon setting the parameters for the PLACESENSOR function, the process proceeds from step S520 to step S521 wherein a query is made to determine if the offset direction is either the north direction or the south direction. If the response to the query is affirmative, the process proceeds to step S522 wherein the value for the coordinate parameter is set as the Y-coordinate. The process thereafter proceeds to step S525.

If the response to the query in step S521 is negative, the process proceeds to step S523 wherein a query is made to determine whether the offset direction is either the east or the west direction. If the response to the query is affirmative, the process proceeds to S524. If the response to the query is negative, the process loops back to step S521. In step S524, the value for the coordinate parameter is set as the −coordinate. The process thereafter proceeds to step S525.

Further in step S525 a query is made to determine whether the offset direction is a north direction or the east direction. If the response to the query is affirmative the process proceeds to step S526. If the response to the query is negative (implying that the offset direction is either the south or the west direction) the process proceeds to step S527.

In step S526, the parameter operator (ops) is assigned as the 'less than equal to' (<=) operation, whereafter the process moves to step S528. In step S527, the parameter operator is assigned as the 'less than equal to' (<=) operation, whereafter the process moves to step S528.

Further, in step S528 a query is made to determine the corresponding value of the entity (cp.co) ops (maxP). Specifically, it is determined whether the current coordinate is less than/greater than equal to the value maxP. Note that maxP assumes the value of maxX/maxY based on the offset direction. If the response to the query is affirmative, the process moves to step S529 else the process moves to step S530.

In step S529 a query is made to determine whether the robot has encountered an obstacle or whether the boundary is encountered. If the response is negative the process moves to step S531 wherein the robot places the sensor and moves ahead in the right direction. Thereafter the process loops back to step S529.

If the response to the query in step S529 is negative (i.e., the robot has encountered an obstacle or a boundary of the geographical region), the process moves to step S530. In step S530, the robot traces its path backwards to its last known starting point and further adds an offset as a step size for the robot to proceed. Specifically, by one embodiment, when a robot encounters a boundary for instance, the robot may trace its path backwards, add an offset and move in the upwards direction to continue the process as depicted in FIGS. 5A and 5B. Note that the process as illustrated in FIGS. 5A and 5B is repeated until all the corners of the geographical region have been visited at least once.

FIG. 6 illustrates a flowchart depicting the steps performed in employing an opportunistic SCAN sensor deployment strategy. By one embodiment, when the geographical region has a rectangular or square shape, the opportunistic SCAN technique runs until the parameter corner (initially assigned to a value of 0) value becomes 4. Specifically, the opportunistic SCAN technique runs until each corner of the geographical region is visited once.

In the execution of the opportunistic SCAN technique, the variables boundary and obstacle check for any available obstacles or boundaries that the robot may encounter in its path. The move_right function turns the robot to move in the right direction with respect to its current position, while place_sensor function deploys a sensor when certain conditions are validated. Further, store_coordinate function gathers the coordinates where place_sensor function places sensor successfully. The parameter corner is incremented if any boundary is faced. Additionally, the parameter dir (corresponding to the direction in which the robot is moving) is changed from its previous value, each time the robot moves up using the move_up function.

The process in FIG. 6 commences in step S601 wherein the value of the parameter counter (C) is initialized to zero.

In step S602, a query is made to determine the value of the counter. By one embodiment, a query is made to determine is the value of C is equal 4. If the response to the query is affirmative, the process terminates, else if the response to the query is negative, the process moves to step S603.

In step S603, a query is performed to determine whether the robot has encountered any boundary or obstacle in its path. If the robot does not encounter a boundary or obstacle, the process moves to step S604, else the process moves to step S605.

In step S604, the robot moves in the rightward direction (by a step size that is equal to the sensors sensing range) and deploys a sensor. Furthermore, the robot also stores in its local memory the coordinate position of the deployed sensor. Upon deploying the sensor the process proceeds to step S606.

If the response to the query in step S603 is negative, the process moves to step S605 wherein a further query is made to determine whether the robot has encountered any boundary or obstacle in its path. If the response to this query is negative, the process loops back to step S602. If the response to the query is affirmative the process moves to step S609.

Returning to step S606 upon placing the sensor (step S605), a query is performed to determine whether the robot has reached a boundary of the geographical region. If the response to the query is affirmative, the process moves to step S607 wherein the value of the counter C is incremented by one, whereafter the process loops back to step S602. If the response to the query is negative, the process moves to step S608 wherein the value of the counter C is not altered and the process loops back to step S602.

Returning now to step S609, wherein based on the robot encountering an obstacle or a boundary (yes in step S605), the robot adds an offset value (sensing range of the sensor) and moves in an upward direction. The process thereafter moves to step S610.

In step S610, a query is made to determine whether the direction in which the robot was moving just prior to encountering the obstacle or boundary is the right direction (i.e., moving in the rightward direction). If the response to the query is affirmative, the process moves to step S611. If the response to the query is negative, the process moves to step S612.

In step S611, the direction in which the robot should move is reversed. Specifically, the direction is set to move left, thereby indicating to the robot that the robot should now proceed in a leftward direction. The process thereafter moves to step S613. In contrast, in step S612, based on the determination in step S610 that the direction in which the robot was moving just prior to encountering the obstacle/boundary was leftwards, the process in step S612 changes the direction in which the robot should now move to the rightward direction. It must be appreciated that in steps S612 and S611, the direction in which the robot is intended to move is flipped from its prior direction upon encountering an obstacle or a boundary.

The process in step S613 queries to determine whether the robot has encountered any boundary or obstacle in its path. If the robot does not encounter a boundary or obstacle, the process moves to step S614, else the process moves to step S605.

In step S614 the robot moves in the assigned direction (dir that is set in either step S611 or S612), and deploys a sensor. Furthermore, the robot also stores in its local memory the coordinate position of the deployed sensor. Further, the process moves to step S615, wherein a query is made to determine whether the robot has reached a boundary of the geographical region. If the response to the query is affirmative, the process moves to step S616 wherein, the value of the counter C is incremented by one, whereafter the process loops back to step S602. If the response to the query is negative, the process moves to step S617 wherein, the value of the counter C is not altered and the process loops back to step S602.

If the response to the query in step S613 is negative, the process moves to step S602. As stated previously, in step S602 a query is made to determine is all corners have the geographical region have been visited exactly once. If the response to the query is negative, the process moves to step S603 and repeats the sensor deployment process. However, if the response to the query is positive (i.e., all corners of the geographical region have been visited once (C=4, for a rectangular/square shaped region)) the process in FIG. 6 terminates.

Figure 7:
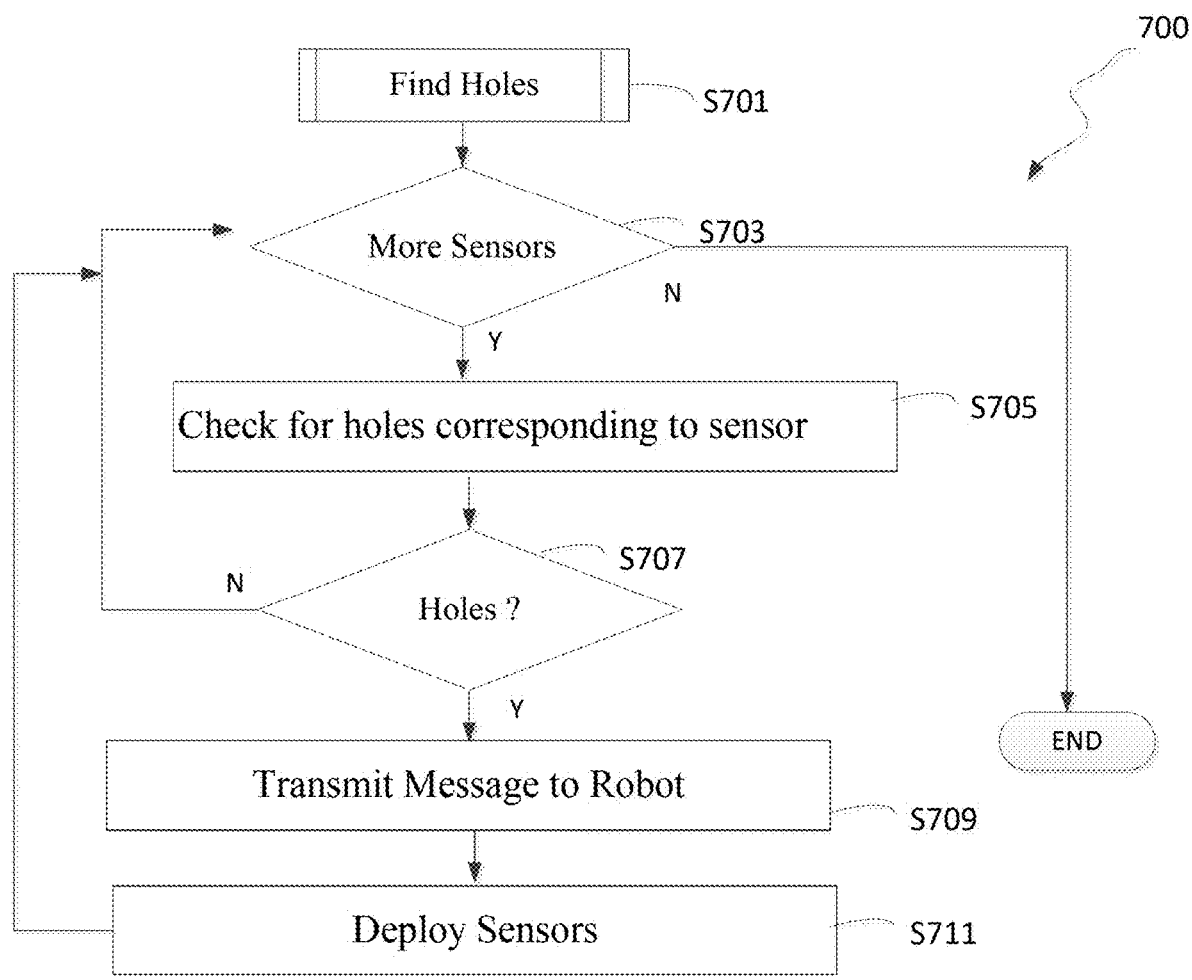
FIG. 7 illustrates a flowchart depicting the steps performed in exploring a critical region.

FIG. 7 illustrates a flowchart depicting the steps performed in exploring a critical region. After the robot gets back to the start position, we assume the whole region is deployed with sensors. But there may be some obstacles which can create holes in the network. To ensure that there is no hole left in the network, sensors run another algorithm which is depicted in FIG. 7. All the sensors run a process referred to herein as FIND HOLES to check for any available empty neighbor. The sensors send this information to the robot with its location and ID thorough intermediate neighbors. Sensor selects the next sensor as transmitter from its neighbors using minimum ID to reach the robot.

The process (Find Holes) of FIG. 7 commences in step S703 wherein a query is made to determine whether any sensors exists that have reported the occurrence of any holes. If there are sensors that have reported the occurrence of holes, each of these sensors is processed in a sequential manner. If the response to the query in step S703 is affirmative the process moves to step S705, else the process simply terminates (indicating no holes detected in the geographical region under consideration).

In step S705, the robot (that is positioned at the CAC after a complete first run of the geographical region) checks to determine the holes for the reporting sensor. Further, in step S707 a query is made to determine whether a hole is found. If the response to the query is negative, the process loops back to step S703. If the response to the query is affirmative, the process moves to step S709. In step S709, the sensor transmits information to robot corresponding to its own location, ID, and the location of the hole and the like, whereafter the process moves to step S711.

In step S711, the robot uses one of the SCAN or opportunistic SCAN described previously in FIGS. 5A and 5B and FIG. 6 to initiate the process of deploying sensors starting from the reported position. Thereafter the process loops back to step S703 to determine if there are any additional sensors that have not reported any information. If the response to the query is affirmative the process as depicted in steps S705-

S711 are repeated. However, if there are no additional sensors the process simply terminates.

According to one embodiment, in order to evaluate the performance of the SCAN and opportunistic-SCAN sensor deployment techniques, simulations can be performed in MATLAB. For instance, the desired location where the sensors have to be placed is set as a 200×200 m² rectangle on which three static obstacles are placed. The sensing range of each sensor is set to S uniformly and robot uses the sensing range as its hop length. $S_r$ is adjustable between 10 m-50 m range. In each simulation, obstacles locations are arbitrarily chosen and both SCAN and opportunistic-SCAN are evaluated.

Figure 8:
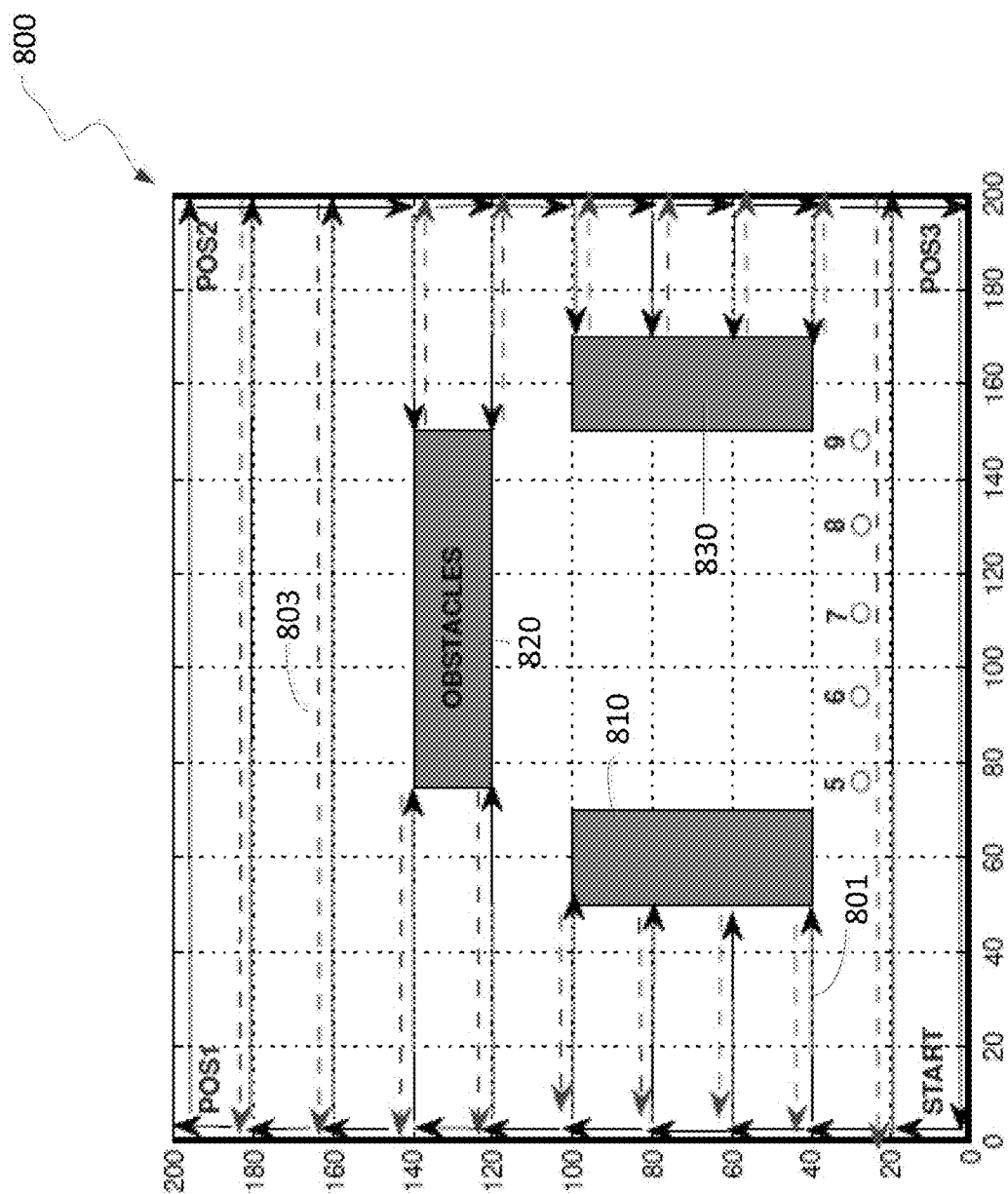
FIG. 8 depicts an exemplary geographical region illustrating the path traversed by a robot while implementing SCAN.
Figure 9:
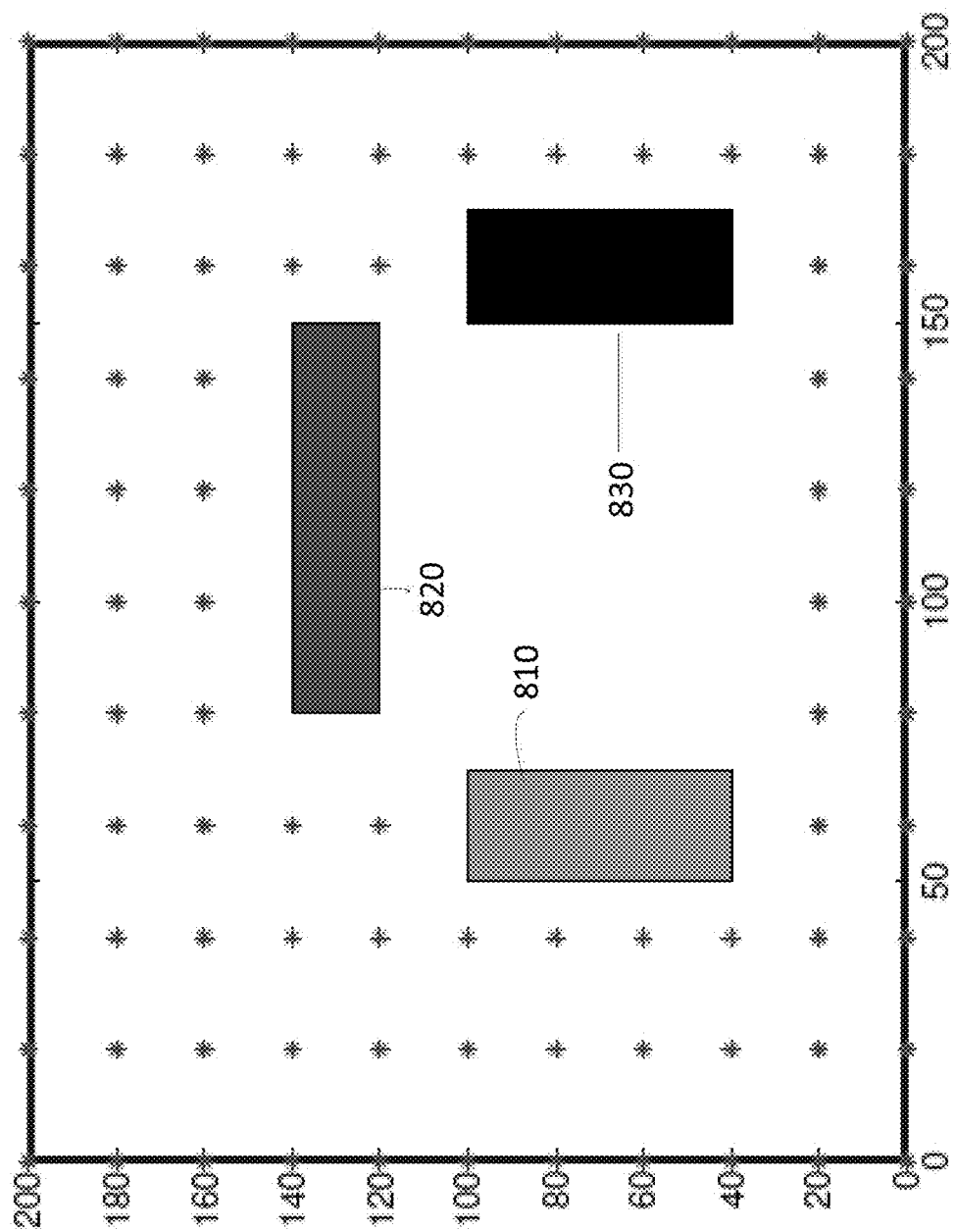
FIG. 9 depicts an exemplary sensor deployment positions for the geographical region of FIG. 8.

FIG. 8 depicts an exemplary geographical region 800 illustrating the path traversed by a robot while implementing SCAN. The geographical region 800 includes three obstacles 810, 820 and 830 respectively. The forward path traversed by the robot while implementing the SCAN deployment technique is depicted as 801, while the reverse path traversed by the robot is depicted by the dotted line 803. In FIG. 9 is depicted an exemplary sensor deployment positions (represented by *) for the geographical region 800 of FIG. 8.

FIG. 8 depicts the area of interest where sensors are to be deployed. It must be appreciated that the configuration as depicted in FIG. 8 is only for illustrative purposes and the SCAN is not limited to any particular type of geographical configuration.

Referring to FIG. 9, the robot starts from START (0, 0) and moves till (200, 0). When it reaches (200, 0), it detects the boundary using it's built in camera/acoustic signals. As soon as the mobile robot detects any obstacle or boundary, it gets back to its starting location on its backward direction. It also adds/subtracts (adding is done in the forward path, subtraction on the reverse path) the sensing range every time it comes back to restart its new path exploration for deployment using below equation.

$$N_s = O_s \pm S_r \quad (7)$$

wherein, $N_s$ denotes new starting location, $O_s$ refers to old starting location, and $S_r$ is the current sensing range.

The above process is repeated until the robot reaches (0, 200) corner. Now, the robot R adds another parameter for checking already placed sensors in the field while going from (0, 200) to (200, 200) location. In FIG. 8, it is evident that the robot can determine the presence of any sensor without going all the way to that specific co-ordinate. It can sense any object using laser beam/acoustic signals from distance $S_r$. Accordingly, the total path travelled by the robot is reduced. So, when the robot moves from (0, 200) to (200, 200), it does not place any sensor in the field as the sensors are already placed in its way. Now, robot moves from (200, 200) to (200, 0) by decreasing its step size by $S_r$ and places sensors accordingly. Furthermore, the robot also assigns sensor ids for each placed sensor, which are increasing monotonically. In doing so, the robot reaches the third location (200, 0). When the robot encounters any point where it has sensors/obstacles/walls around its four directions, it pauses, and further moves forward or backward as per the situation.

Figure 10:
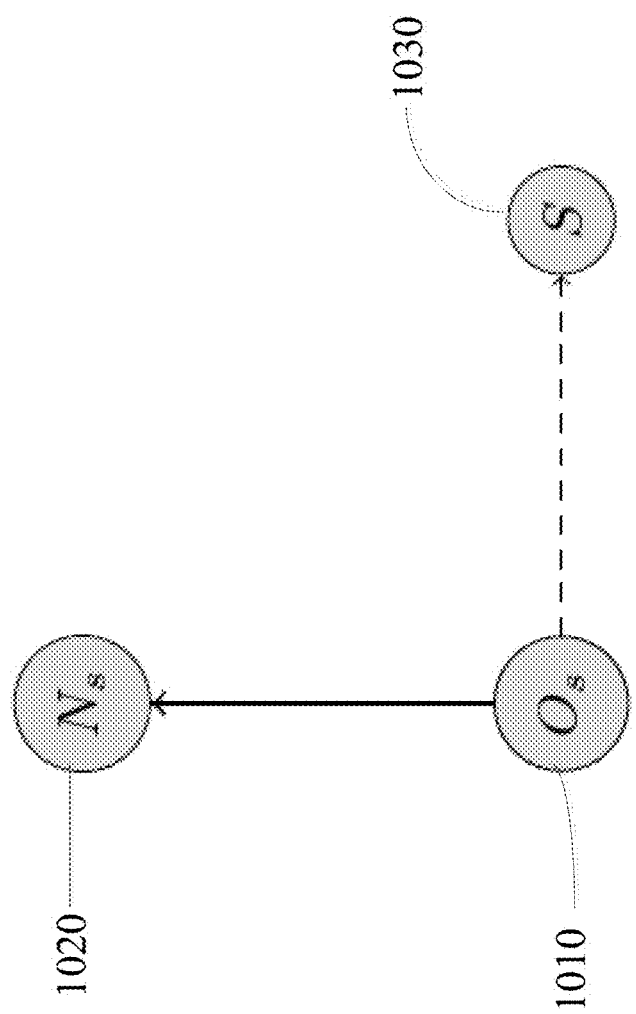
FIG. 10 depicts an exemplary graph illustrating the movement of the robot from an initial starting point to a new starting point.

In the simulation, the robot R moves to (200, 0) and from there it gets back to the original location (0, 0). Thus, robot follows the forward movement in four directions and the sensor placement direction is always on right side with respect to that direction as depicted in FIG. 10 which depicts a graph illustrating the movement of the robot from an initial starting point (1010) to a new starting point (1020). In FIG. 10, the node S (1030) corresponds to a stopping criterion when the robot encounters a boundary/obstacle.

The SCAN process terminates when the robot visits all the four corners of the region at least once. As shown in FIG. 9, the robot visits all the four co-ordinates in order (0, 0)→(0, 200)→(200, 200)→(200, 0). Thus, the robot will terminate running SCAN and stay at CAC (Command and Control Center) which for the sake of simplicity is assumed to be located at coordinate (0, 0)). Upon completing the SCAN process, by one embodiment of the present disclosure, additional coverage can be ensured if the obstacles are simple in shape and placement. Specifically, the sensors deployed by the robot execute a focused SCAN (SCAN-FC) technique in order to determine the additional prospective locations where sensors can be placed. For instance, referring to FIG. 8, sensors with ID 5, 6, 7, 8, 9 have empty neighbors on at least one of their sides. Accordingly, all of these nodes transmit a beacon message using multi hop communication back to location 0, 0 (i.e., to the CAC). For example, if node 5 has neighbors 3, 4, and 6 then it transmits the message to node 3 first, which in turn transmits the message to sensor node 1. In a similar manner, sensor node 6 transmits the beacon message to sensor node 4, which in turn transmits the message to sensor node 2, and node 2 transmits the message to node 1. When robot (and alternatively the CAC) receives all the message transmissions from nodes 5, 6, and 7, the CAC prioritizes the received messages according to lowest node id first. Thereafter, the robot moves to location of sensor node 5 (which belongs to the set of locations stored in the memory of the robot, and that were initially calculated by the robot) using the reverse path, and resumes placing sensors using SCAN.

Figure 11:
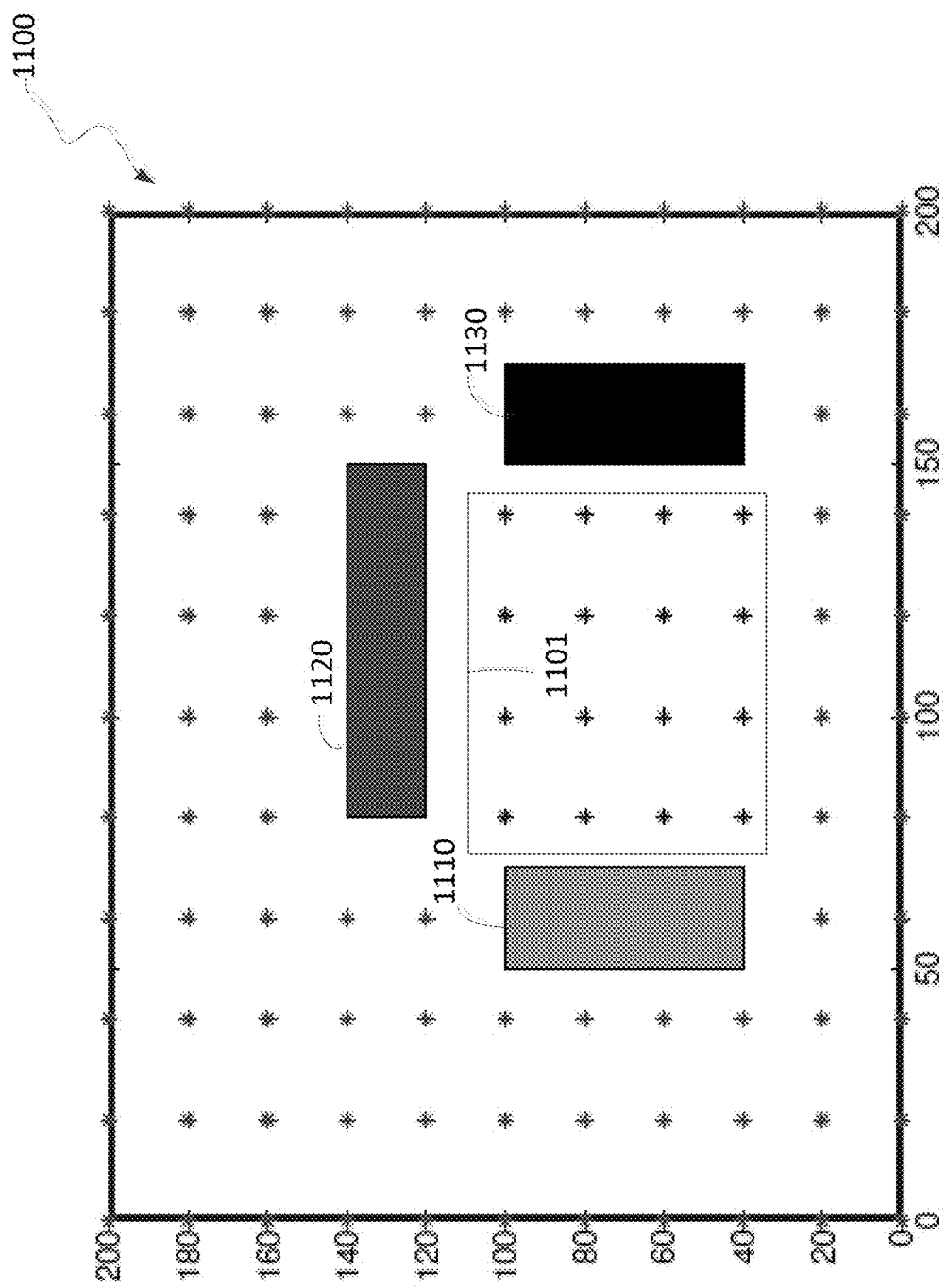
FIG. 11 depicts the exemplary geographical region of FIG. 9 including additional sensor deployments.
Figure 12:
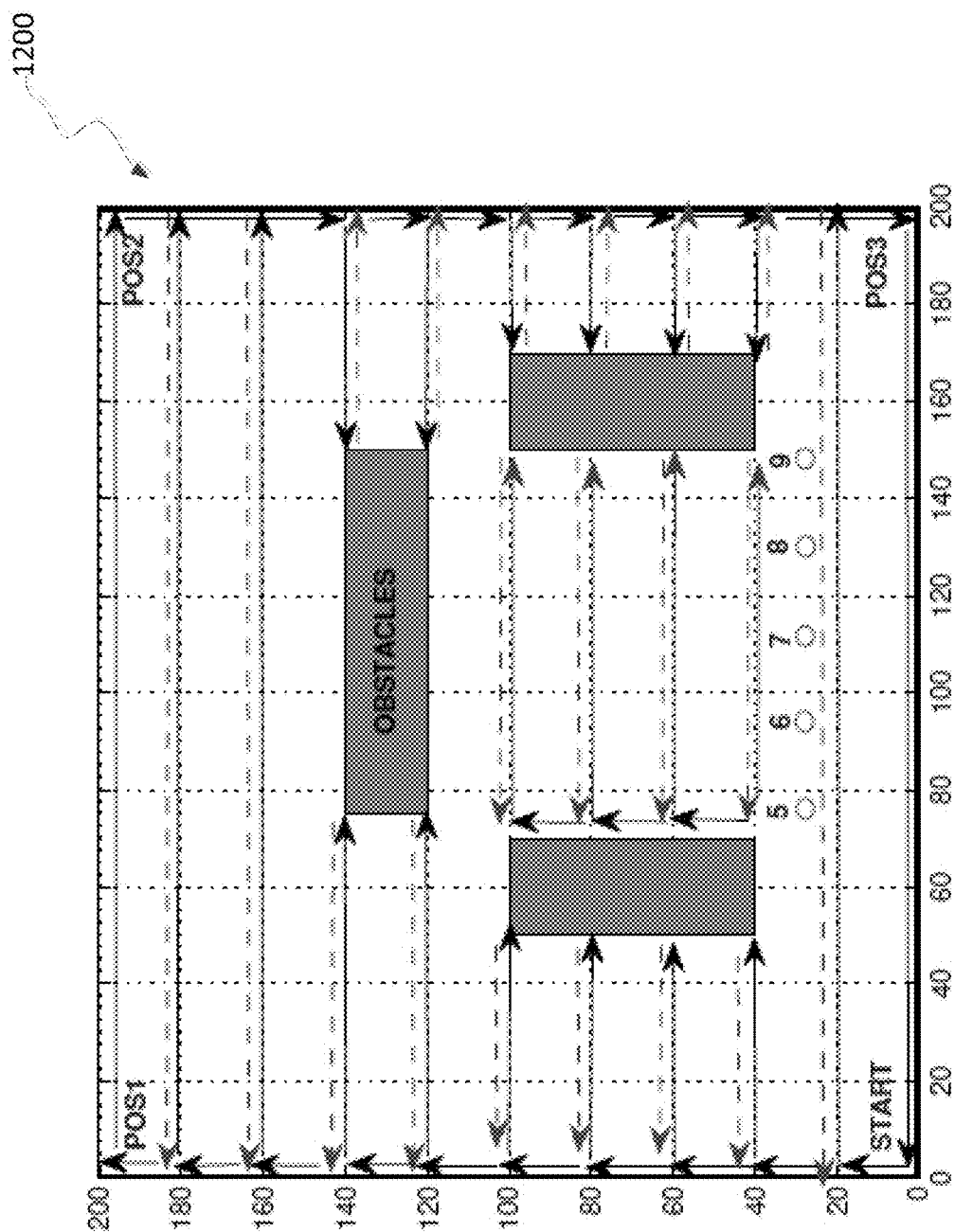
FIG. 12 depicts an exemplary geographical region illustrating the path traversed by a robot while implementing SCAN and SCAN-FC.
Figure 13:
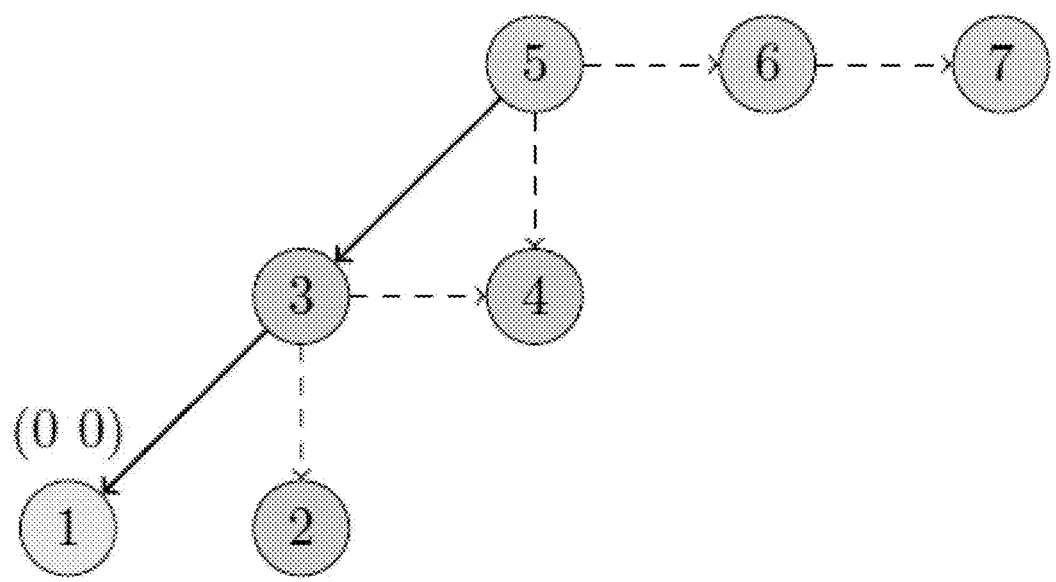
FIG. 13 depicts a graph illustrating message forwarding according to one embodiment.

Specifically, FIG. 11 depicts the exemplary geographical region (including obstacles labeled 1110, 1120, and 1130) similar to those of FIG. 9 including additional sensor deployments in the area marked 1101. Upon completing the SCAN process, sensors are deployed in the geographical region as depicted in FIG. 9. Further, upon performing the focused coverage of the region, sensors in region 1101 are deployed as illustrated in FIG. 11. FIG. 12 depicts the geographical region illustrating the path traversed by a robot while implementing SCAN and SCAN-FC process. It must be appreciated that as shown in FIG. 12, five sensors (5, 6, 7, 8, and 9) with at least one empty neighbor ae selected to perform the focused coverage of the sensors. Accordingly, the sensor with the lowest id (Node 5) is responsible for event notification to the CAC. Moreover, FIG. 13 depicts a graph illustrating message forwarding according to one embodiment. In the example as depicted in FIG. 13, initially nodes 5, 6, and 7 have at least one empty neighbor. In this case and stated previously, node 5 is responsible for CAC notification.

Figure 14:
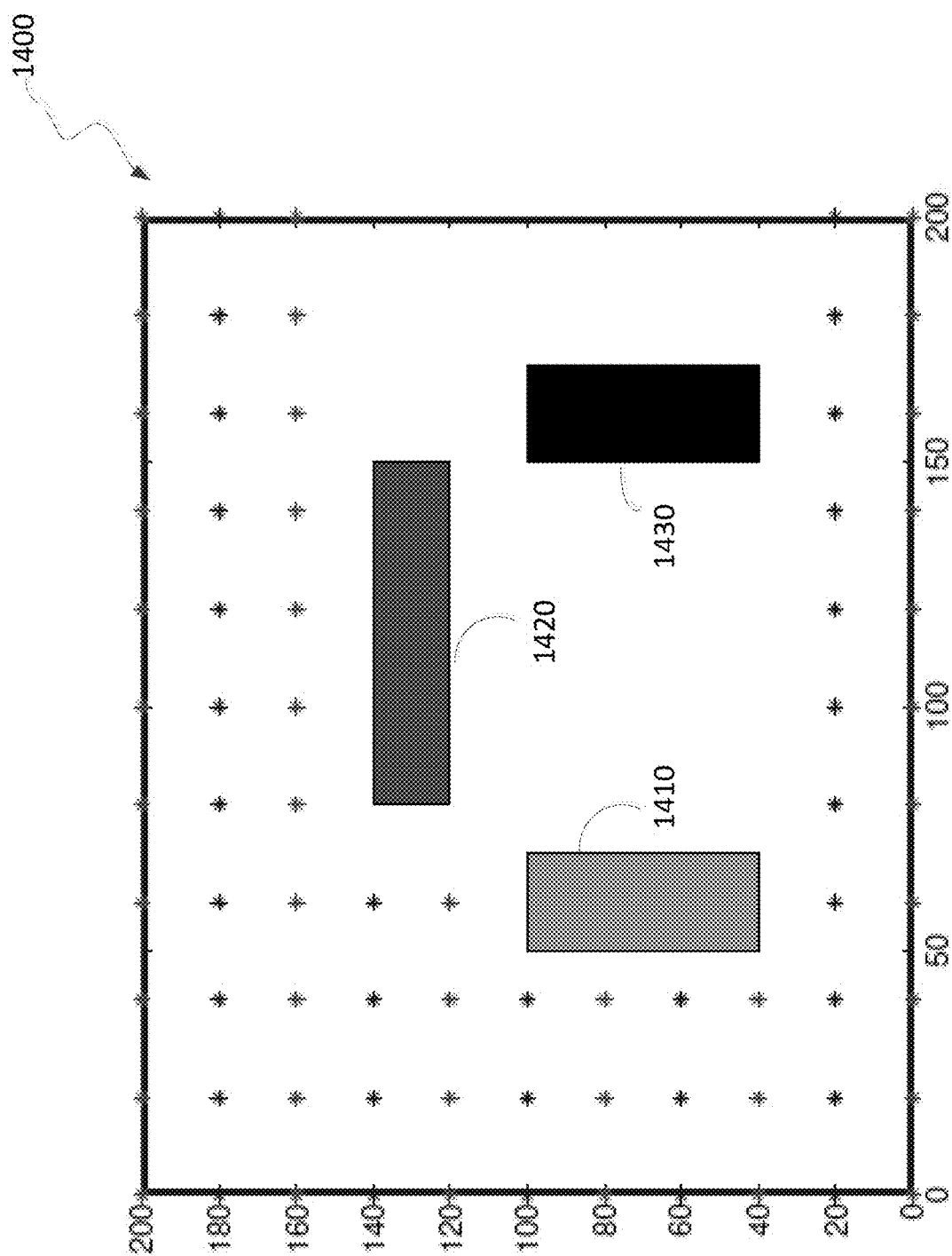
FIG. 14 depicts an exemplary sensor deployment positions for the opportunistic SCAN.
Figure 15:
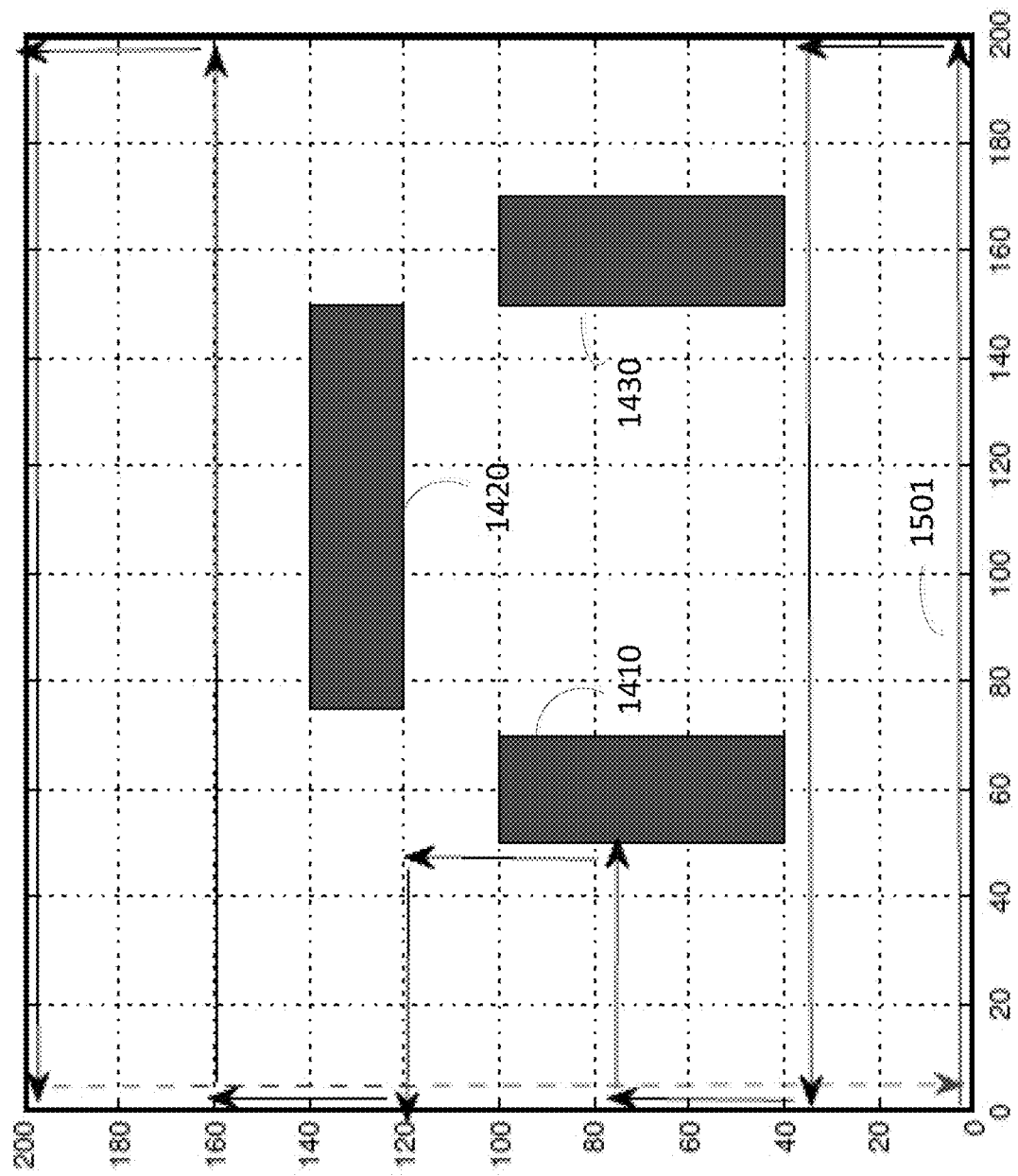
FIG. 15 depicts an exemplary geographical region illustrating the path traversed by a robot while implementing the opportunistic SCAN.

Turning now to FIG. 14 is depicted an exemplary sensor deployment positions for the opportunistic SCAN in the geographical region 1400. FIG. 15 depicts the path traversed by a robot while implementing the opportunistic SCAN in the region 1400. The region 1400 includes three obstacles 1410-1430.

As shown in FIG. 15, the robot moves quite similarly as in the case of the SCAN technique, except that the robot does not go back (i.e., backtrack) when any obstacle and boundary is faced. The robot starts its tour from START (0,0) and reaches position (200,0). At this time instant, the robot does not go back to START(0,0) location, but rather checks for any other available route to traverse. As shown in FIG. 15, the robot upon reaching position 200, 0 moves in the top-ward (i.e., north direction). Herein lies the difference between SCAN and opportunistic SCAN, in terms of switching the deployment direction. Further, as the robot keeps the status of the last deployment direction, it always turns opposite from earlier whenever it has to change the normal route. Additionally, referring to FIG. 14 it must be appreciated that may be possible that in the opportunistic SCAN technique, more empty spaces are left over (as compared to the SCAN technique) after an initial scan by the robot due to the opportunistic behavior of the robot. Furthermore, note that when the robot reaches coordinate (0,200) the opportunistic SCAN technique terminates, as all four corners of the geographical region have been traversed.

Figure 16:
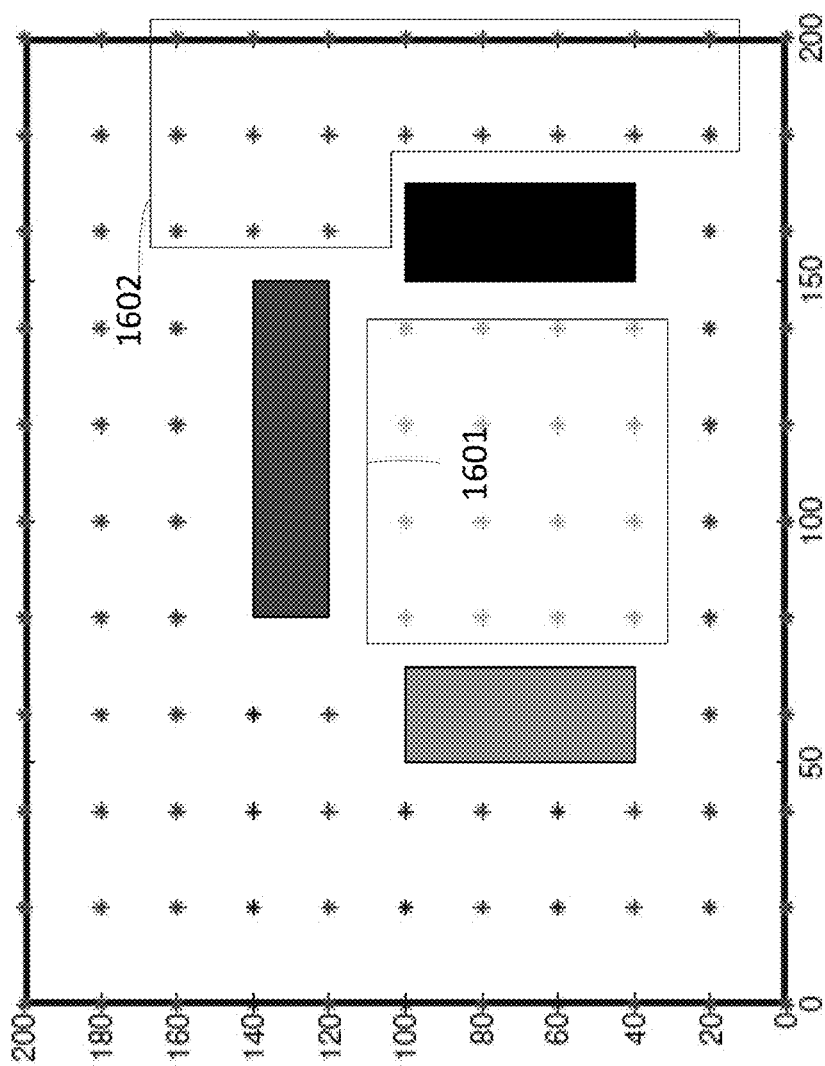
FIG. 16 depicts the exemplary geographical region including additional sensor deployments obtained after executing opportunistic SCAN.
Figure 17:
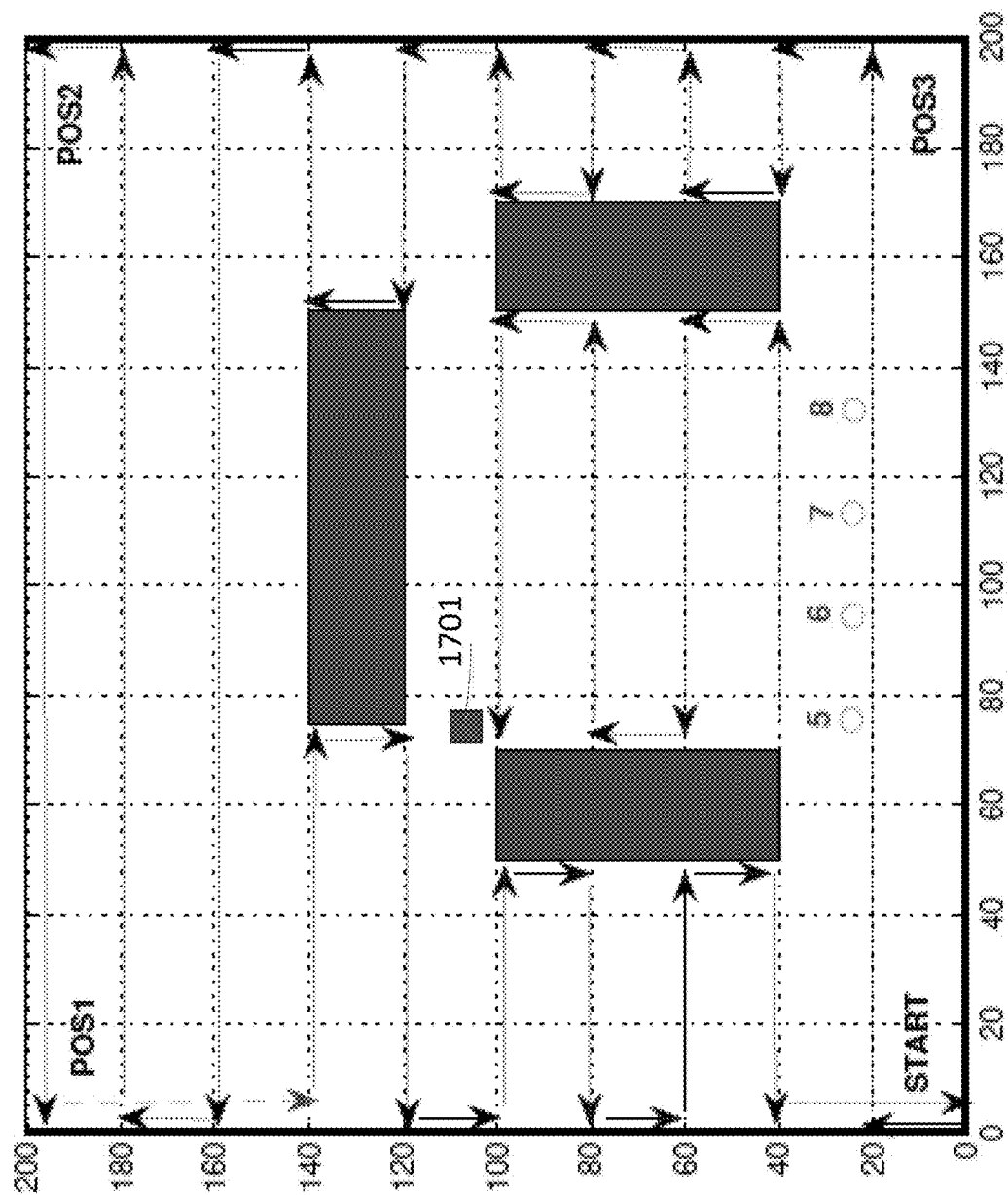
FIG. 17 depicts an exemplary geographical region illustrating the path traversed by a robot while implementing opportunistic SCAN with focused coverage.
Figure 18:
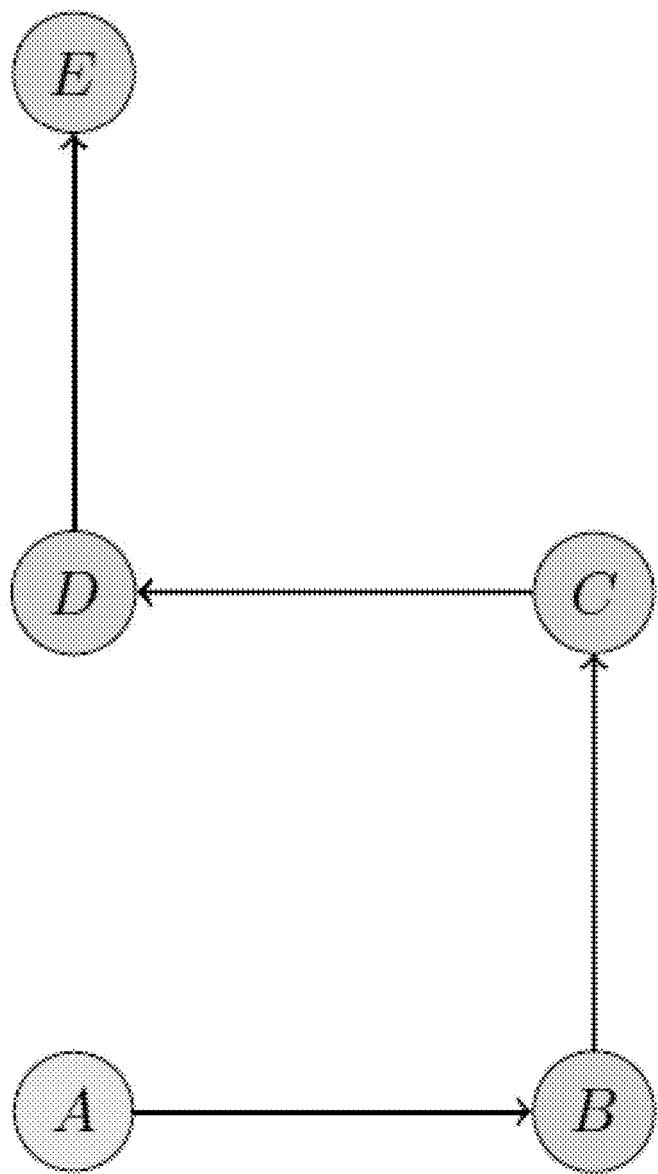
FIG. 18 depicts an exemplary graph depicting the addition of a sensing range in the robot's path traversal.

FIG. 15 depicts that the robot follows the path START-POS3-POS2-POS1. Further, the robot would proceed to reach POS1, as it has already visited four corners once. According to one embodiment, while going back to START, if any empty place is found, sensors are deployed in those locations as well. At the end of the robots' first tour, there remains some empty area like SCAN. The nodes 5, 6, 7, 8 again follow a focused coverage technique and transmit the information about the empty neighborhood to START. Then robot moves to 5 and starts to deploy again. Note that FIG. 14 shows the deployment of sensors by the robot at its first tour (i.e., first run of the opportunistic SCAN), whereas FIG. 16 depicts the overall deployment including the deployment obtained by using the focused coverage technique that deploys sensors in regions such as 1601 and 1602. FIG. 17 depicts a path traversed by the robot while implementing the opportunistic scan followed by the focused coverage technique. In FIG. 17, 1701 depicts a gray square which denotes the hiatus for the robot after the second round (focused coverage). The robot waits at 1701 for a predetermined amount of time to determine if any prospective hole exists which has not yet been explored. If no more notifications about holes are found, the robot simply returns to START position. In the SCAN and opportunistic SCAN sensor deployment techniques, the robot may add its sensing range in the forward path to move to the next location as shown in FIG. 18. Specifically, as shown in FIG. 18, as nodes 'B' and 'D' the robot adds Sr to its step size to move forward to locations 'C' and 'E', respectively.

In what follows is provided, with reference to FIGS. 19A-19E, a detailed analysis of the robots' travelled distance, coverage, message overhead, and processing time (i.e., simulation time) required by the sensor deployment techniques described herein.

Figure 19A:
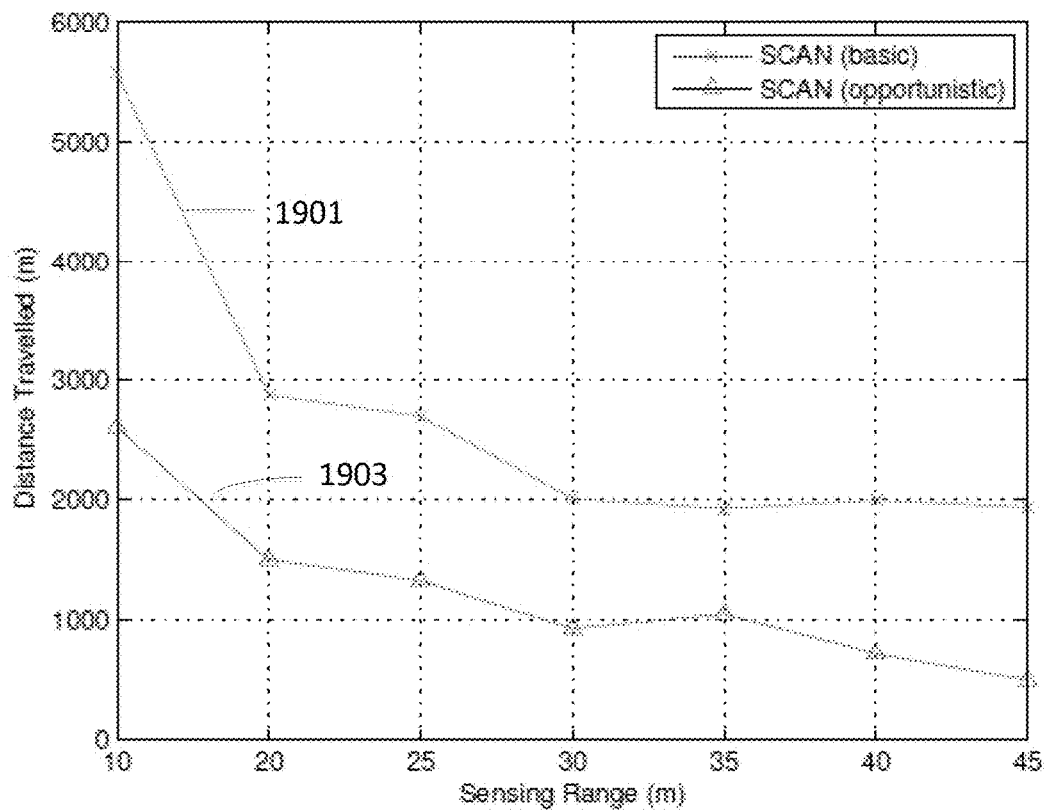
FIG. 19A-19E illustrate exemplary graphs depicting a comparison for the parameters of a robots' travelled distance, coverage, message overhead, and processing time, respectively that is required by the sensor deployment techniques described herein.

FIG. 19A shows distance travelled by the robot after the initial round. On comparing the distance with varying sensing range ($S_r$) of the sensor which is the step size for the robot, opportunistic SCAN (1903) performs better (more than 50%) for any sensing range (10-45 m) than the SCAN technique (1901).

Figure 19B:
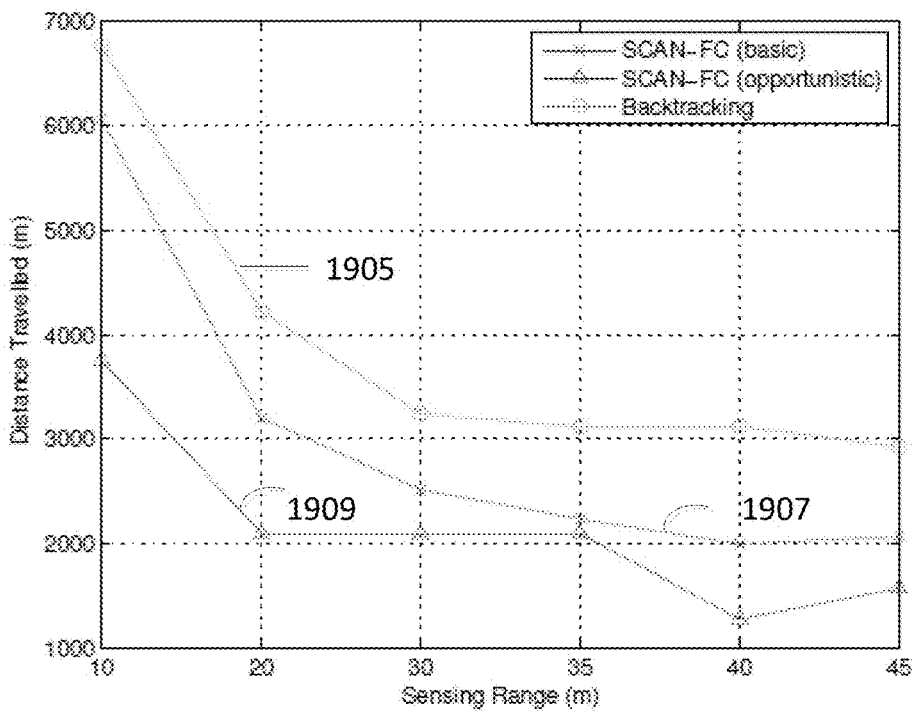

FIG. 19B depicts the total travelled distance by the robot after second round and more when the area is covered 100%. In this case, SCAN-FC (Opportunistic) performs better (curve 1909) than the SCAN technique (1907) and backtracking techniques (905). The total travelled distance is almost 1.5 times higher for SCAN-FC (Basic). On the other hand, it is observed that SCAN-FC (Opportunistic) travels almost half the distance travelled by the Backtracking algorithm.

Figure 19C:
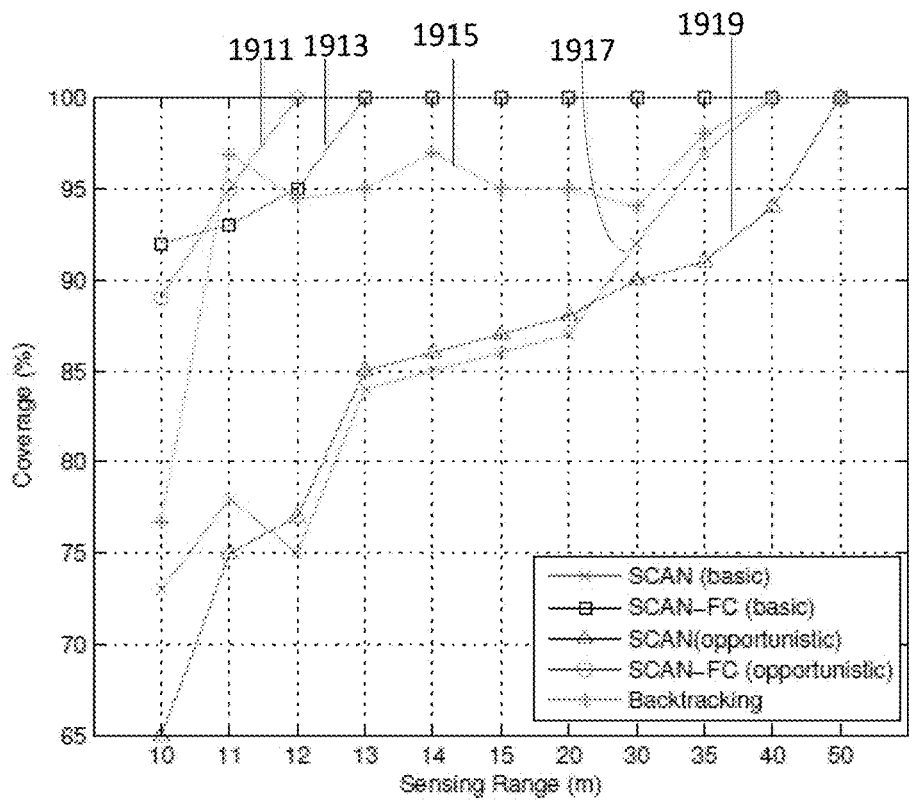

FIG. 19C depicts the sensing range versus coverage plot for SCAN-FC opportunistic (1911), SCAN-FC-basic (1913), backtracking (1915), SCAN basis (curve 1917), and SCAN-opportunistic (1919). Basic-SCAN provides better coverage at first tour compared to Opportunistic SCAN. But, Opportunistic SCAN requires much less distance to travel.

Additionally, SCAN-FC (Basic) shows more coverage than SCAN-FC (Opportunistic) for sensing range of 10 meter. Both of their coverage performance converges when sensing range becomes more than 12 meter. So, there are trade-offs for using them for different requirement. For instance, if the desired output is to have the maximum coverage with short sensing range and less traveling distance, opportunistic version works well. Coverage calculation is done using equation (8) and (9) respectively. We compared our results with Backtracking algorithm and found that the convergence is not totally 100% for the smaller range, where both the version of SCAN provides full coverage. It can also be observed that Backtracking algorithm also exploits randomness in its coverage behavior in terms of different sensing range and obstacle distribution.

$$C = \frac{n_d}{N - n_{ol}} \tag{8}$$

$$n_{ol} = \frac{A_0}{S_r} \tag{9}$$

Where, C=Coverage, $n_{ol}$=number of sensors those could be placed if obstacles were not present. $A_0$=Total area covered by the obstacles, and $n_d$=Number of sensors actually placed. N=total number of sensors those have to be placed if there were no obstacles.

Figure 19D:
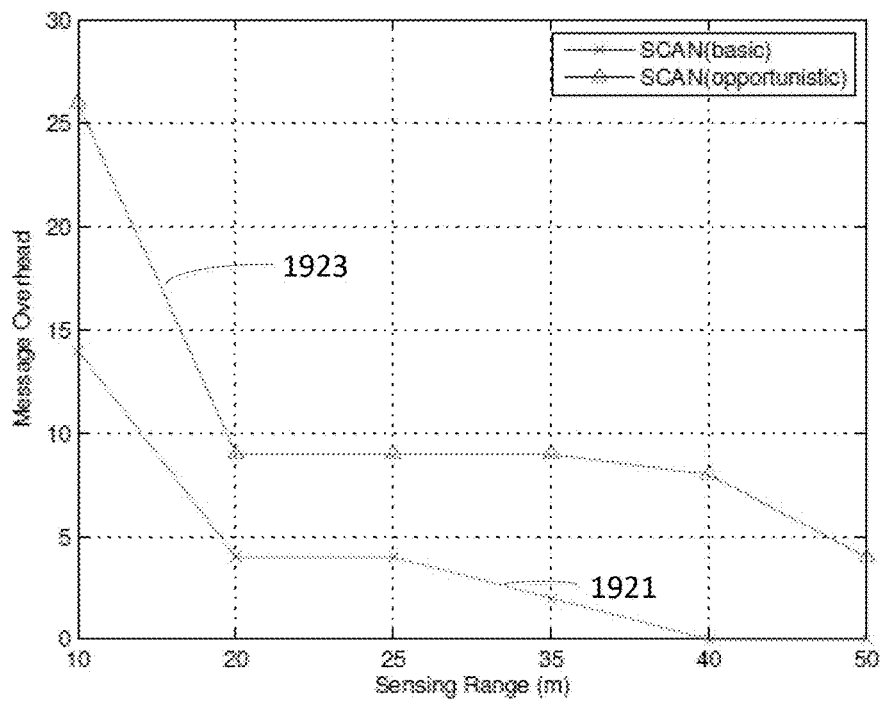

FIG. 19D shows the overhead messages which are calculated from the notification messages sent to the START. The result shows that opportunistic SCAN (curve 1923) provides more overhead than SCAN (curve 1921). It must be appreciated that the overhead will vary due to the different obstacle locations. Such a behavior occurs due to the initial opportunistic search from OPP-SCAN technique. OPP-SCAN enforces the robot to travel in the ROI in such a way that it can avoid following reverse path resulting in leaving more empty points compared to basic SCAN. Thus, the overhead message sent by the sensors becomes more than the basic SCAN algorithm.

Table I depicts the comparison of various techniques described herein with regards to distance covered and percentage area covered for a sensing range of 10 meters.

TABLE I

Comparison of sensor deployment techniques.

| Algorithm | Distance Covered (m) | Coverage (%) |
|---|---|---|
| SCAN (basic) | 5570 | 72.50 |
| SCAN-FC (basic) | 6060 | 92.50 |
| SCAN (opportunistic) | 2610 | 65.25 |
| SCAN-FC (opportunistic) | 3750 | 89.20 |
| Backtracking | 6760 | 75.75 |

Figure 19E:
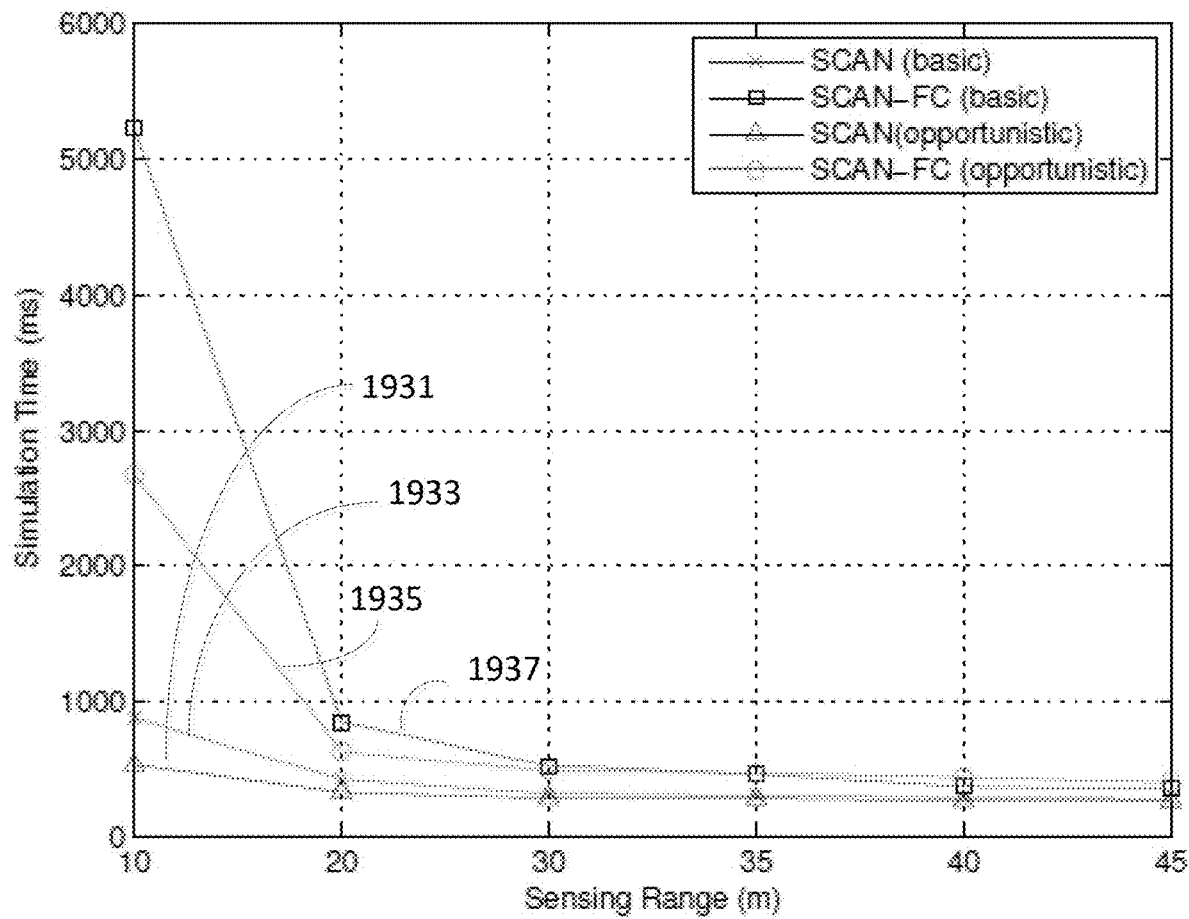
Figure 20:
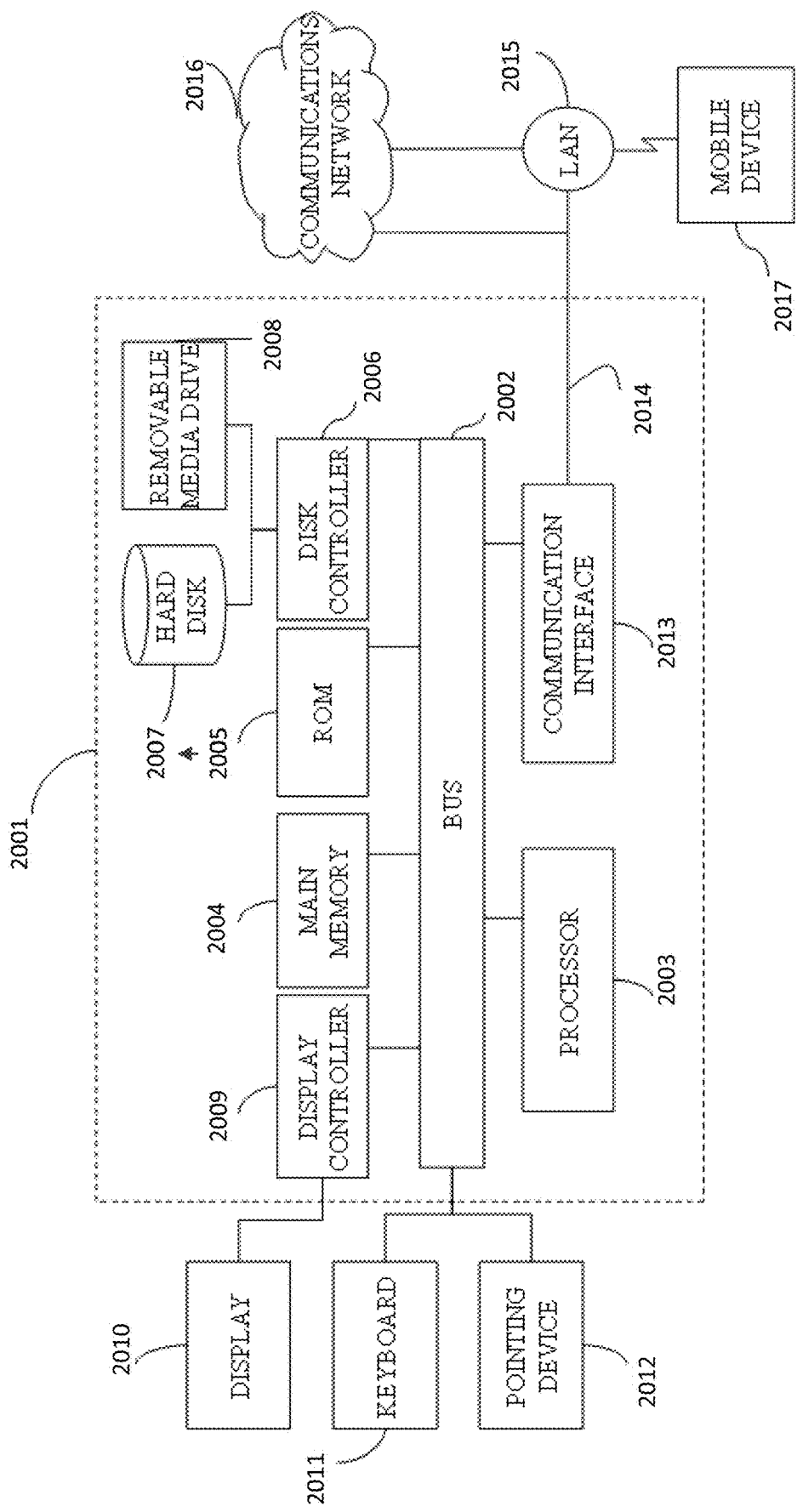
FIG. 20 illustrates an exemplary block diagram of a computing device.

FIG. 19E shows the simulation time required for all the four versions: opportunistic SCAN (1931), basic SCAN (1933), opportunistic SCAN with Focused coverage (1935), and SCAN with Focused coverage (1937). It must be appreciated that the SCAN technique spends most of the time traveling. Additionally, robot travels without fetching any placed sensors twice for almost 95% of its first tour. This is one of the strongest reasons for having less travel distance in opportunistic SCAN-FC. On the contrary, Basic-SCAN passes at least twice by the already deployed sensors. Accordingly, the SCAN-FC opportunistic technique may by one embodiment be a good choice to minimize the energy consumption as energy is limited in wireless ad hoc networks.

Each of the functions of the described embodiments may be implemented by one or more processing circuits. A processing circuit includes a programmed processor (for example, processor 2003 in FIG. 9), as a processor includes circuitry. A processing circuit also includes devices such as an application-specific integrated circuit (ASIC) and circuit components arranged to perform the recited functions. For instance, the CAC as well the robot may include such processing circuitry that may be configured to perform the above stated functions.

The various features discussed above may be implemented by a computer system (or programmable logic). For instance, the CAC as well as the robot may include processing circuitry that is configured to perform the functions of the above described embodiments. FIG. 9 illustrates such a computer system 2001.

The computer system 2001 includes a disk controller 2006 coupled to the bus 2002 to control one or more storage devices for storing information and instructions, such as a magnetic hard disk 2007, and a removable media drive 2008 (e.g., floppy disk drive, read-only compact disc drive, read/write compact disc drive, compact disc jukebox, tape drive, and removable magneto-optical drive). The storage devices may be added to the computer system 2001 using an appropriate device interface (e.g., small computer system interface (SCSI), integrated device electronics (IDE), enhanced-IDE (E-IDE), direct memory access (DMA), or ultra-DMA).

The computer system 2001 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2001 may also include a display controller 2009 coupled to the bus 2002 to control a display 2010, for displaying information to a computer user. The computer system includes input devices, such as a keyboard 2011 and a pointing device 2012, for interacting with a computer user and providing information to the processor 2003. The pointing device 2012, for example, may be a mouse, a trackball, a finger for a touch screen sensor, or a pointing stick for communicating direction information and command selections to the processor 2003 and for controlling cursor movement on the display 2010.

The processor 2003 executes one or more sequences of one or more instructions contained in a memory, such as the main memory 2004. Such instructions may be read into the main memory 2004 from another computer readable medium, such as a hard disk 2007 or a removable media drive 2008. One or more processors in a multi-processing arrangement may also be employed to execute the sequences of instructions contained in main memory 2004. In alternative embodiments, hard-wired circuitry may be used in place of or in combination with software instructions. Thus, embodiments are not limited to any specific combination of hardware circuitry and software.

As stated above, the computer system 2001 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 2001, for driving a device or devices for implementing the invention, and for enabling the computer system 2001 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 2003 for execution. A computer readable medium may take many forms, including but not limited to, non-volatile media or volatile media. Non-volatile media includes, for example, optical, magnetic disks, and magneto-optical disks, such as the hard disk 2007 or the removable media drive 2008. Volatile media includes dynamic memory, such as the main memory 2004. Transmission media, on the contrary, includes coaxial cables, copper wire and fiber optics, including the wires that make up the bus 2002. Transmission media also may also take the form of acoustic or light waves, such as those generated during radio wave and infrared data communications.

Various forms of computer readable media may be involved in carrying out one or more sequences of one or more instructions to processor 2003 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 2001 may receive the data on the telephone line and place the data on the bus 2002. The bus 2002 carries the data to the main memory 2004, from which the processor 2003 retrieves and executes the instructions. The instructions received by the main memory 12004 may optionally be stored on storage device 2007 or 2008 either before or after execution by processor 2003.

The computer system 2001 also includes a communication interface 2013 coupled to the bus 2002. The communication interface 2013 provides a two-way data communication coupling to a network link 2014 that is connected to, for example, a local area network (LAN) 2015, or to another communications network 2016 such as the Internet. For example, the communication interface 2013 may be a network interface card to attach to any packet switched LAN. As another example, the communication interface 2013 may be an integrated services digital network (ISDN) card. Wireless links may also be implemented. In any such implementation, the communication interface 2013 sends and receives electrical, electromagnetic or optical signals that carry digital data streams representing various types of information.

The network link 2014 typically provides data communication through one or more networks to other data devices. For example, the network link 2014 may provide a connection to another computer through a local network 2015 (e.g., a LAN) or through equipment operated by a service provider, which provides communication services through a communications network 2016. The local network 2014 and the communications network 2016 use, for example, electrical, electromagnetic, or optical signals that carry digital data streams, and the associated physical layer (e.g., CAT 5 cable, coaxial cable, optical fiber, etc.). The signals through the various networks and the signals on the network link 2014 and through the communication interface 2013, which carry the digital data to and from the computer system 2001 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 2001 can transmit and receive data, including program code, through the network(s) 2015 and 2016, the network link 2014 and the communication interface 2013. Moreover, the network link 2014 may provide a connection through a LAN 2015 to a mobile device 2017 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

What is claimed is:

1. Deployment method for sensors in a wireless sensor network by a robot in a geographical region, the method comprising:
    receiving from a server, a first instruction including information corresponding to the geographical region, the information including at least a plurality of boundary locations of the geographical region and a first coordinate of the geographical region corresponding to a starting location for sensor deployment;
    receiving from the server, a second instruction indicating one of a first manner and a second manner of deploying sensors in the geographical region;
    computing by circuitry, based on the second instruction, a path to traverse the geographical region in a plurality of steps, each step of the plurality of steps having a predetermined magnitude, the traversing being performed until one of a first stopping criteria corresponding to the first manner of deploying sensors and a second stopping criteria corresponding to the second manner of deploying sensors being satisfied;
    deploying sensors in the geographical region at each traversed step size, wherein the sensors form a wireless sensor network in communication with a command and control center;
    receiving from each deployed sensor, information indicating absence of sensors in a neighboring area of the deployed sensor;
    repeating the traversing and deploying of sensors in the neighboring area based on the received information until all corners of the geographical region have been visited at least once, and
    checking for any available empty neighboring area, wherein checking for any available empty neighboring area includes
        receiving, from one or more of the sensors, empty neighboring area information from the sensor adjacent to the empty neighboring area, the empty neighboring area information including a first location corresponding to the sensor adjacent to the empty neighboring area, ID of the sensor adjacent to the empty neighboring area, and a second location corresponding to the empty neighboring area, and
        deploying sensors, wherein deploying sensors starts from the first location received from the sensor adjacent to the empty neighboring area,
    wherein a total distance traversed by the robot in the first manner of deploying sensors is $2n*(m+1)/1+m$, wherein m is a width of the geographical region, n is a length of the geographical region, and l is a sensing range of the sensor,
    wherein the robot traces its path backwards to its last known starting point and further adds an offset as a step size for the robot to proceed when the robot encounters an obstacle or boundary of the geographical region.

2. The method of claim 1, wherein the second instruction includes one of the first manner and the second manner of deploying sensors in the geographical region based on an orientation of a plurality of obstacles in the geographical region.

3. The method of claim 1, wherein the predetermined magnitude of the step size is equal to a sensing range of the sensors.

4. The method of claim 1, further comprising:
    traversing to the first coordinate of the geographical region based on one of the first stopping criteria and the second stopping criteria being satisfied.

5. The method of claim 1, wherein the received information includes an identification number and a coordinate position of the deployed sensor.

6. The method of claim 1, wherein the first stopping criteria corresponding to the first manner of deploying sensors is satisfied upon the robot traversing each corner of the geographical region at least once.

7. The method of claim 1, wherein the second stopping criteria corresponding to the second manner of deploying sensors is satisfied upon the robot traversing each corner of the geographical region exactly once.

8. The method of claim 1, wherein the first manner of deploying sensors in the geographical area further comprising:
    traversing by the step size, in an upward direction to a second location;
    moving in a right direction from the second location; and
    traversing back to the second location based on encountering one of an obstacle and a boundary of the geographical region.

9. The method of claim 1, wherein the second manner of deploying sensors in the geographical area further comprising:
- traversing by the step size in a first direction;
- moving in an upward direction based on encountering one of an obstacle and a boundary of the geographical region; and
- traversing by the step size in a second direction, the second direction being opposite to the first direction.

10. The method of claim 1, wherein a total distance traversed by the robot in the second manner of deploying sensors is n*(m+1)/l+m, wherein m is a width of the geographical region, n is a length of the geographical region, and l is a sensing range of the sensor.

* * * * *